US011308107B1

(12) United States Patent
Pati et al.

(10) Patent No.: US 11,308,107 B1
(45) Date of Patent: Apr. 19, 2022

(54) METHOD, APPARATUS, AND COMPUTER PROGRAM PRODUCT FOR NETWORK DATA LINKING AND TRANSMISSION THEREOF

(71) Applicant: GROUPON, INC., Chicago, IL (US)

(72) Inventors: Amrut Pati, San Francisco, CA (US); Rajat Shroff, Redwood Shores, CA (US); James J. Sullivan, Piedmont, CA (US); Kyle Oppenheim, San Francisco, CA (US); Martin Westhead, San Francisco, CA (US); Elton Cheung, Millbrae, CA (US)

(73) Assignee: GROUPON, INC., Chicago, IL (US)

( * ) Notice: Subject to any disclaimer, the term of this patent is extended or adjusted under 35 U.S.C. 154(b) by 177 days.

(21) Appl. No.: 16/218,830

(22) Filed: Dec. 13, 2018

Related U.S. Application Data

(60) Provisional application No. 62/599,483, filed on Dec. 15, 2017.

(51) Int. Cl.
*G06F 16/2458* (2019.01)
*H04L 29/08* (2006.01)
(Continued)

(52) U.S. Cl.
CPC ...... *G06F 16/2471* (2019.01); *G06F 16/2322* (2019.01); *G06F 16/252* (2019.01); *G06Q 30/00* (2013.01); *H04L 67/306* (2013.01)

(58) Field of Classification Search
CPC ............ G06F 16/2471; G06F 16/2322; G06F 16/252; H04L 67/306; G06Q 30/00
See application file for complete search history.

(56) References Cited

U.S. PATENT DOCUMENTS 6,041,309 A * 3/2000 Laor ............... G06Q 10/087
235/379
2003/0233278 A1* 12/2003 Marshall ......... G06Q 30/0212
705/14.35
(Continued)

OTHER PUBLICATIONS

How to fix a bad user interface—Scott Hurff [online] [retrieved May 16, 2019], Retrieved from the Internet: <http://scotthurff.com/posts/why-your-user-interface-is-awkward-youre-ignoring-the-ui-stack>. (2019) 49 pages.

*Primary Examiner* — Matthew J Ellis
(74) *Attorney, Agent, or Firm* — Alston & Bird LLP

(57) ABSTRACT

Methods, apparatuses, and computer program products for improving network database functionalities are discussed therein, such as a computer-implemented method including generating, in a network database, a first dataset associated with a client account, wherein the first dataset indicates a restricted value; receiving, from a client device associated with the client account, a first data linking query to associate the first dataset with an instrument identifier; generating, in the network database, a dataset pointer mapping the first dataset with the instrument identifier, wherein the instrument identifier is associated with a physical instrument; receiving a transmission indication associated with the physical instrument, wherein the transmission indication indicates the instrument identifier and a partial amount associated with the first dataset; updating, in the network database, the first dataset based on the transmission indication; and outputting, to the client device, a transmission notification indicating the updated first dataset.

16 Claims, 28 Drawing Sheets

(51) Int. Cl.
*G06F 16/23* (2019.01)
*G06F 16/25* (2019.01)
*G06Q 30/00* (2012.01)
*H04L 67/306* (2022.01)

(56) References Cited

U.S. PATENT DOCUMENTS

| | | | | |
|---|---|---|---|---|
| 2012/0084117 | A1* | 4/2012 | Tavares | G06Q 30/00 |
| | | | | 705/7.29 |
| 2014/0164220 | A1* | 6/2014 | Desai | G06Q 20/227 |
| | | | | 705/39 |
| 2015/0235275 | A1* | 8/2015 | Shah | G06Q 30/0269 |
| | | | | 705/14.66 |
| 2016/0012465 | A1* | 1/2016 | Sharp | G06Q 20/386 |
| | | | | 705/14.17 |
| 2016/0092866 | A1* | 3/2016 | Liberty | G06Q 20/3224 |
| | | | | 705/41 |
| 2016/0283925 | A1* | 9/2016 | Lavu | G06Q 20/401 |
| 2017/0178174 | A1* | 6/2017 | Mitchell | G06Q 30/0233 |
| 2017/0323472 | A1* | 11/2017 | Barnes | G06K 9/3208 |
| 2017/0371881 | A1* | 12/2017 | Reynolds | G06F 16/256 |

* cited by examiner

1101

1103

1202

Swipe Your Visa Card 4532

No need to show the voucher.
Get cashback

1901 — Watch Tutorial Video

1903 — Add another card

1905 — I want to use Voucher

METHOD, APPARATUS, AND COMPUTER PROGRAM PRODUCT FOR NETWORK DATA LINKING AND TRANSMISSION THEREOF

CROSS-REFERENCE TO RELATED APPLICATIONS

This non-provisional application claims the benefit of U.S. Provisional Patent Application No. 62/599,483, filed Dec. 15, 2017, the entire contents of which are incorporated herein by reference.

TECHNOLOGICAL FIELD

Embodiments of the invention relate, generally, to facilitating data linking and transmission, and in particular, to update dataset based on transmission indication associated with a physical instrument thereof.

BACKGROUND

Various systems are configured to perform data linking and transmission. Applicant has identified a number of deficiencies and problems associated with existing approaches. Through applied effort, ingenuity, and innovation, many of these identified problems have been solved by developing solutions that are included in the embodiments of the present disclosure, many examples of which are described in detail herein.

BRIEF SUMMARY

Embodiments of the invention relate, generally, to improving network data linking and transmission. In some embodiments, a computer-implemented method includes generating, in a network database, a first dataset associated with a client account, wherein the first dataset indicates a restricted value; receiving, from a client device associated with the client account, a first data linking query to associate the first dataset with an instrument identifier; generating, in the network database, a dataset pointer mapping the first dataset with the instrument identifier, wherein the instrument identifier is associated with a physical instrument; receiving a transmission indication associated with the physical instrument, wherein the transmission indication indicates the instrument identifier and a partial amount associated with the first dataset; updating, in the network database, the first dataset based on the transmission indication; and outputting, to the client device, a transmission notification indicating the updated first dataset.

In some embodiments, a computer-implemented method further includes generating, in the network database, a second dataset associated with the client account; receiving, from the client device, a second data linking query to associate the second dataset with the instrument identifier; determining whether the second dataset is linkable, and in response to determining that the second dataset is not linkable, outputting, to the client device, an electronic notification indicating that the second data linking query cannot be completed.

In some embodiments, a computer-implemented method further includes generating a time code associated with the transmission indication for the first dataset; determining, via a processor, whether a predetermined amount of time has passed based on the time code; and in response to determining that the predetermined amount of time has passed, outputting, to the client device, a redemption completion indication associated with the first dataset.

In some embodiments, the predetermined amount of time is twenty-four hours.

In some embodiments, updating, in the network database, the first dataset based on the transmission indication further includes determining whether the partial amount satisfies the restricted value; and in response to determining that the partial amount does not satisfy the restricted value, decreasing the restricted value based on the partial amount.

In some embodiments, a computer-implemented method further includes in response to determining that the partial amount satisfies the restricted value, outputting, to the client device, a redemption completion indication.

In some embodiments, a computer-implemented method further includes outputting, to the client device, a dataset linking interface, wherein the dataset linking interface includes a plurality of impressions associated with a plurality of datasets; and receiving, via the dataset linking interface, a selection of an impression corresponds to the first dataset from the plurality of datasets.

In some embodiments, an apparatus including at least one processor and at least one non-transitory memory including program code is provided. The at least one non-transitory memory and the program code are configured to, with the processor, cause the apparatus to at least generate, in a network database, a first dataset associated with a client account, wherein the first dataset indicates a restricted value; receive, from a client device associated with the client account, a first data linking query to associate the first dataset with an instrument identifier; generate, in the network database, a dataset pointer mapping the first dataset with the instrument identifier, wherein the instrument identifier is associated with a physical instrument; receive a transmission indication associated with the physical instrument, wherein the transmission indication indicates the instrument identifier and a partial amount associated with the first dataset; update, in the network database, the first dataset based on the transmission indication; and output, to the client device, a transmission notification indicating the updated first dataset.

In some embodiments, a computer program product including at least one non-transitory computer-readable storage medium having computer-readable program code portions stored therein is provided. The computer-readable program code portions includes an executable portion configured to generate, in a network database, a first dataset associated with a client account, wherein the first dataset indicates a restricted value; receive, from a client device associated with the client account, a data linking query to associate the first dataset with an instrument identifier; generate, in the network database, a dataset pointer mapping the first dataset with the instrument identifier, wherein the instrument identifier is associated with a physical instrument; receive a transmission indication associated with the physical instrument, wherein the transmission indication indicates the instrument identifier and a partial amount associated with the first dataset; update, in the network database, the first dataset based on the transmission indication; and output, to the client device, a transmission notification indicating the updated dataset.

BRIEF DESCRIPTION OF THE SEVERAL VIEWS OF THE DRAWINGS

Figure 1:
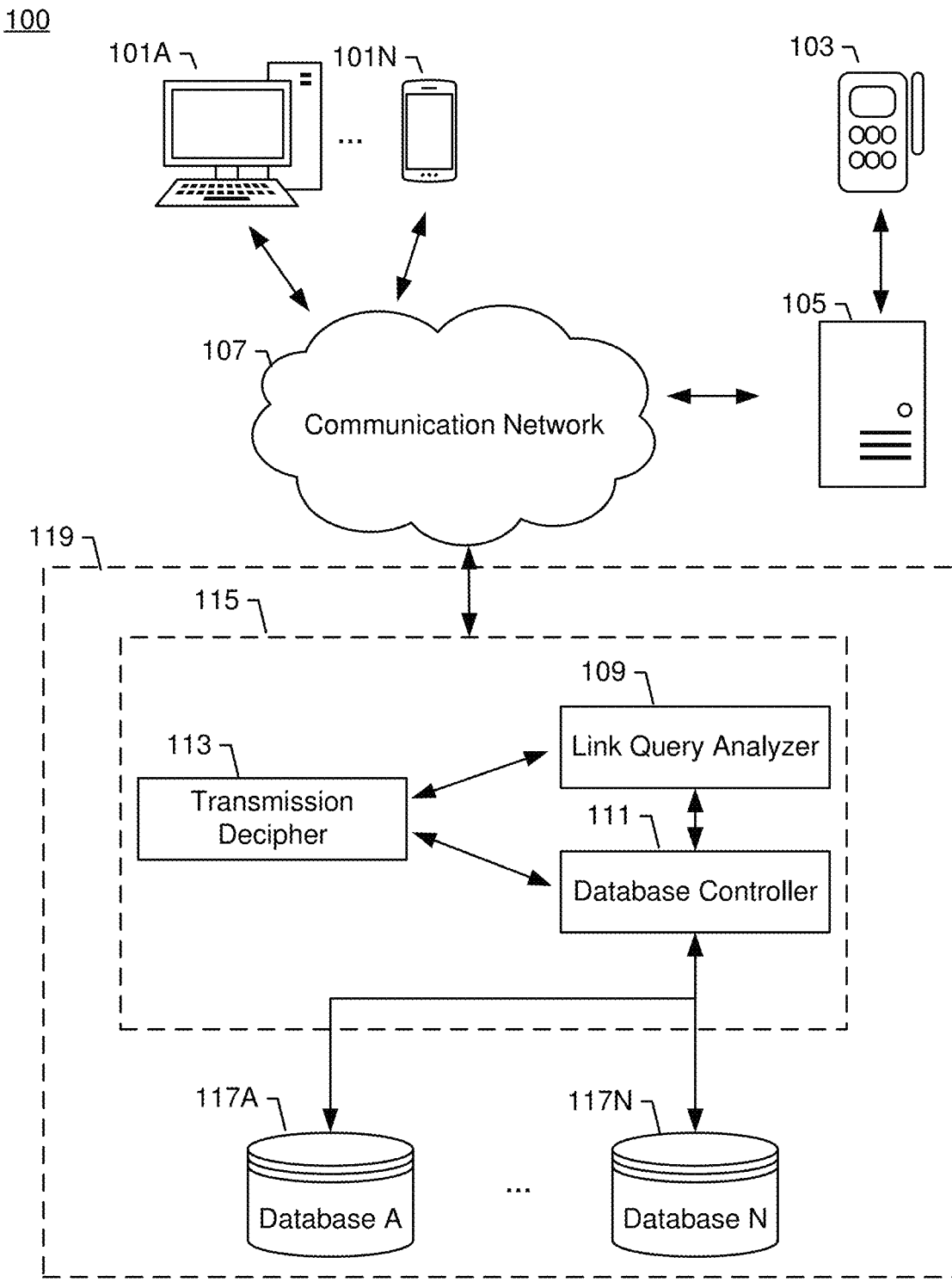
Figure 2:
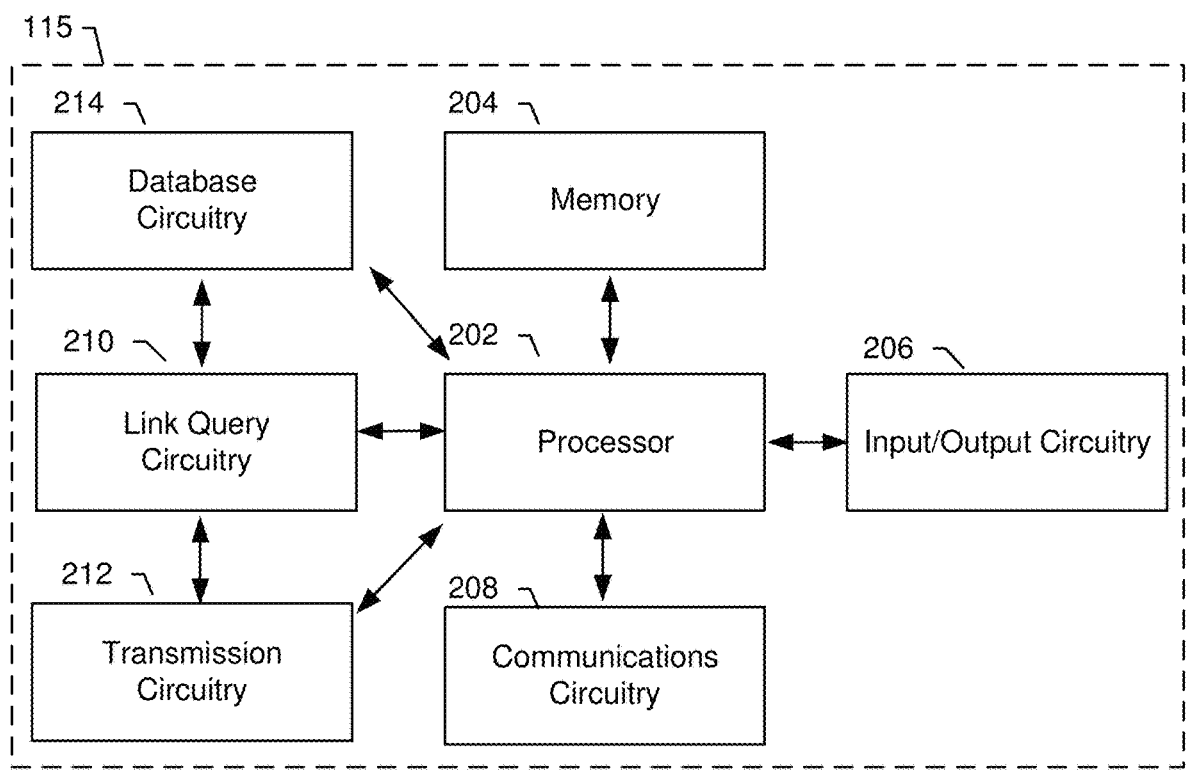
Figure 3:
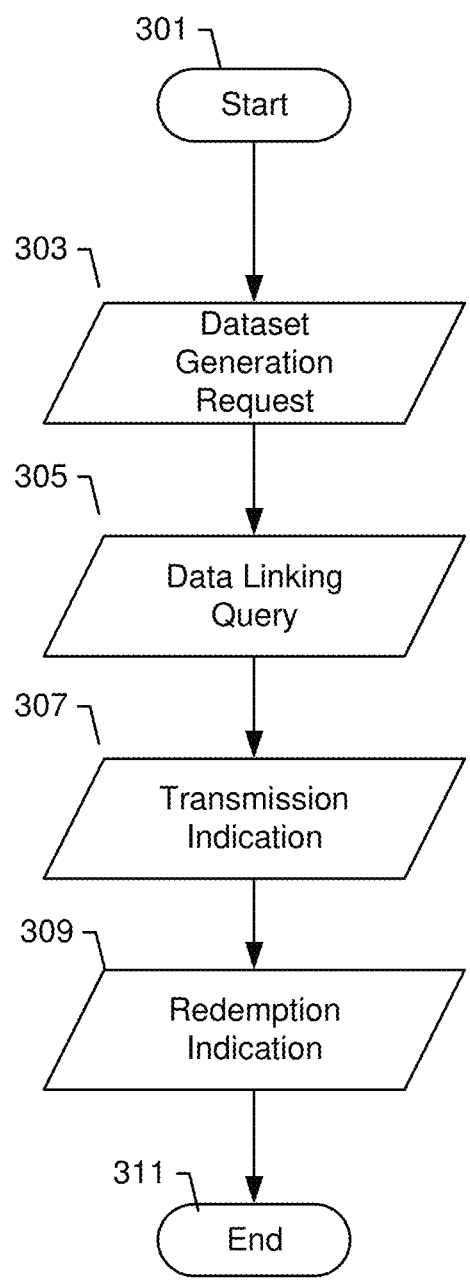
Figure 4:
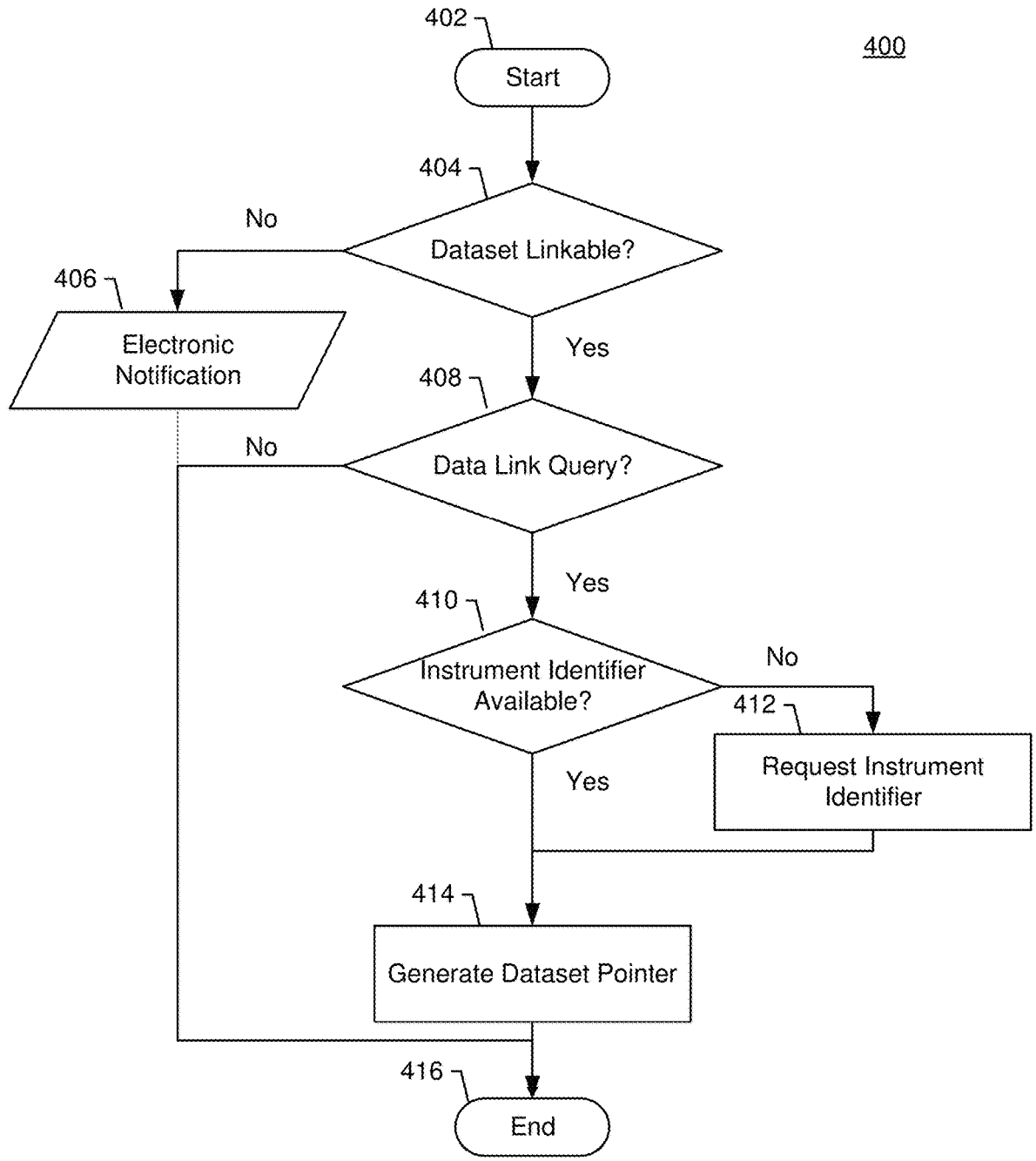
Figure 5:
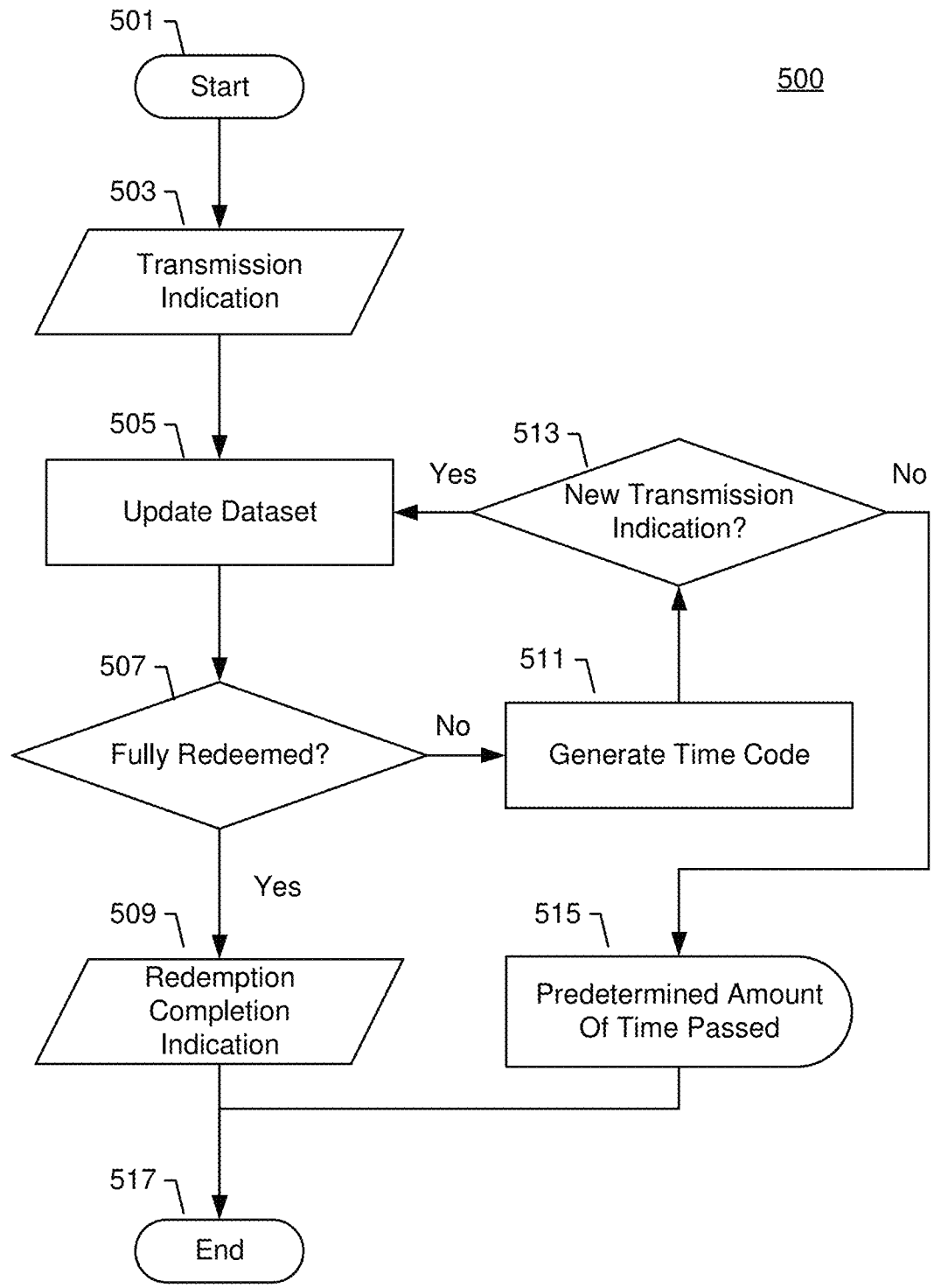
Figure 6:
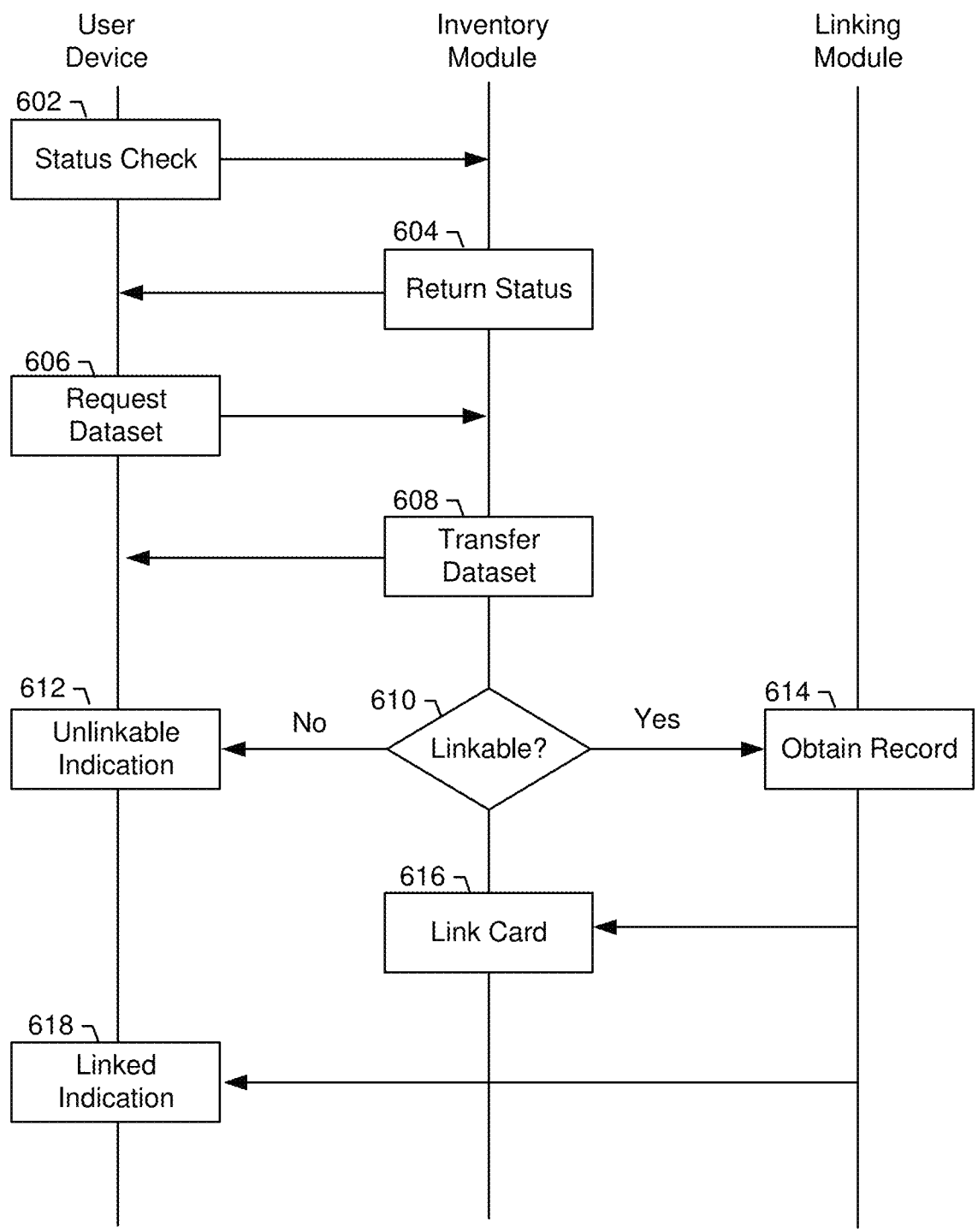
Figure 7:
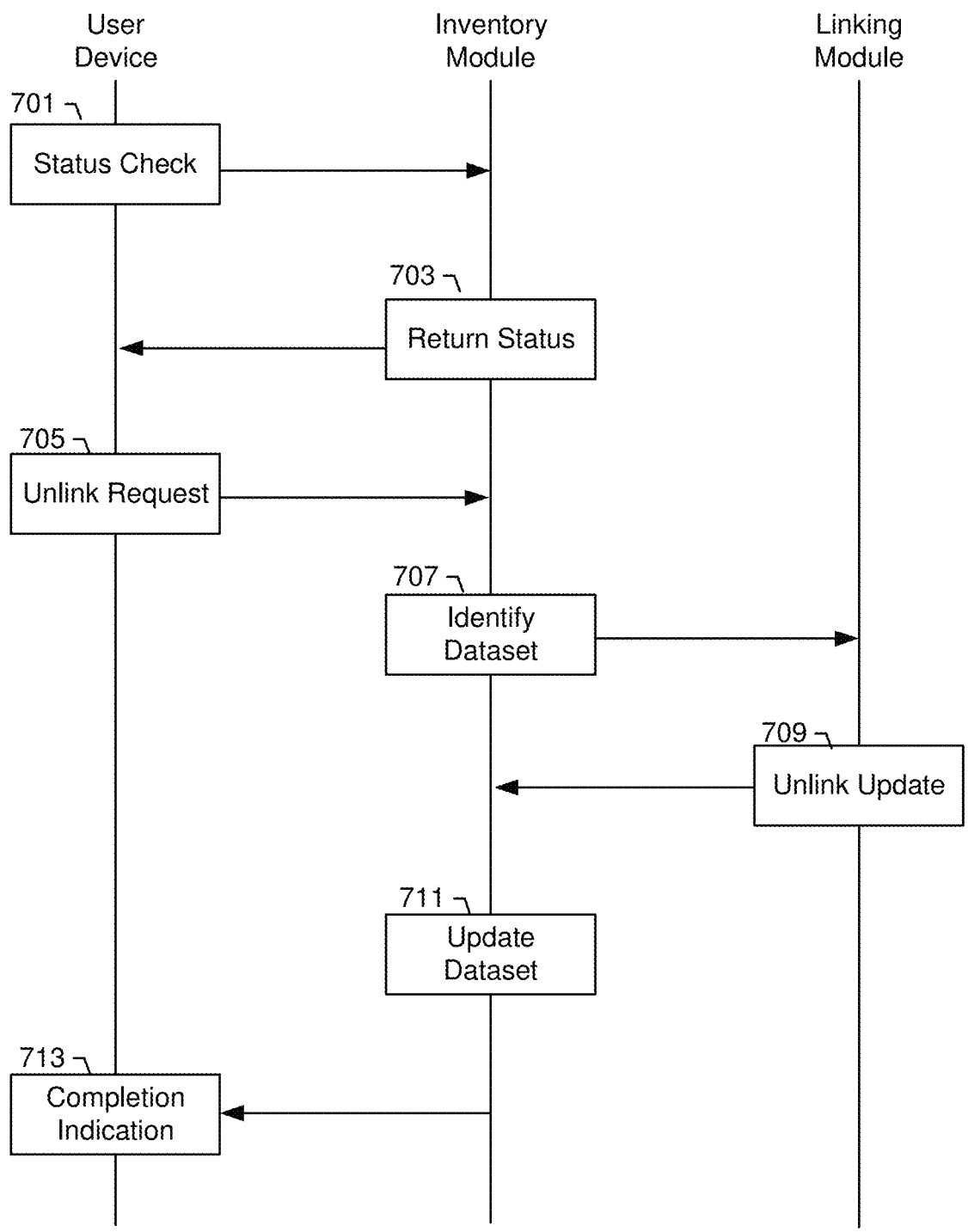
Figure 8:
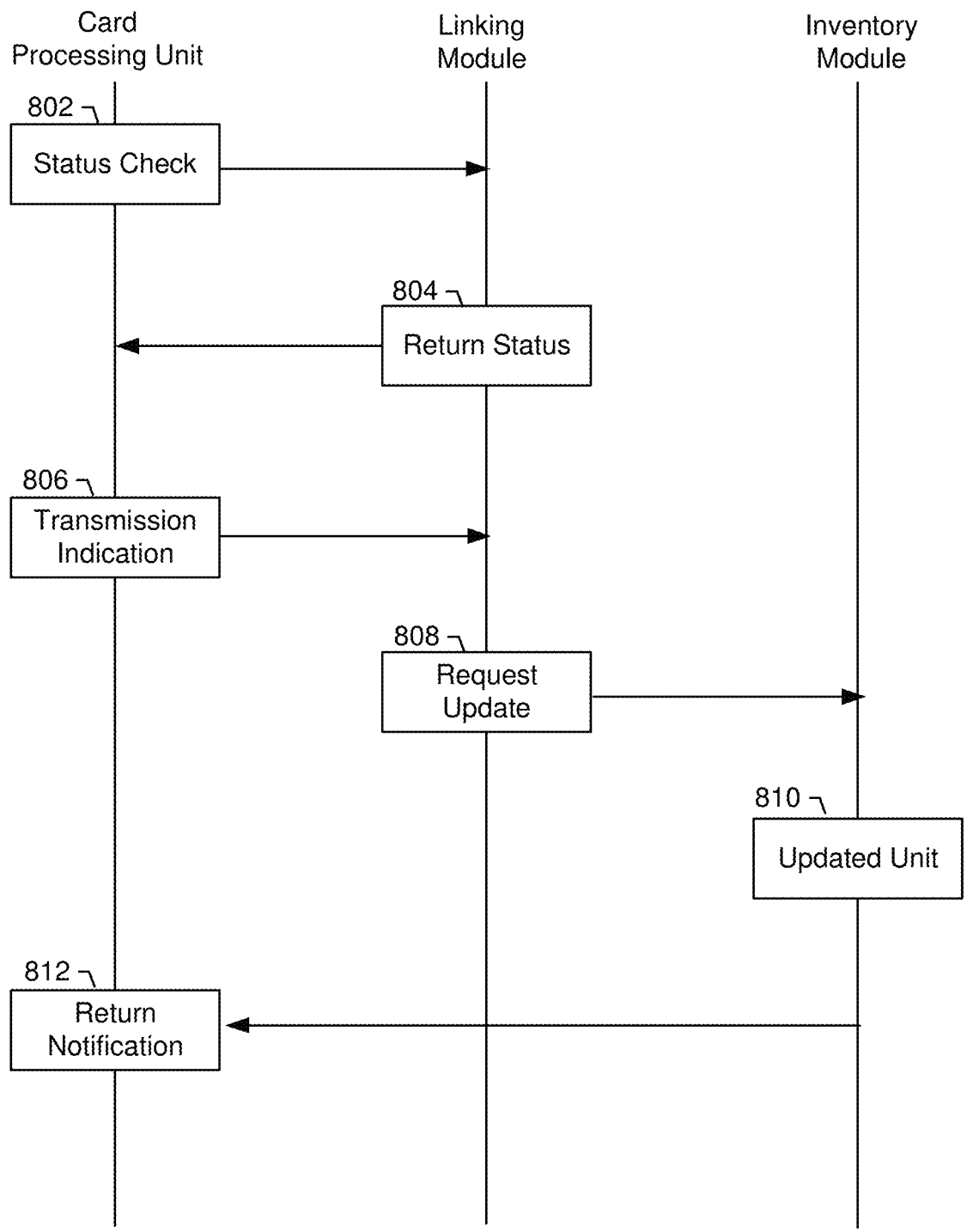
Figure 9:
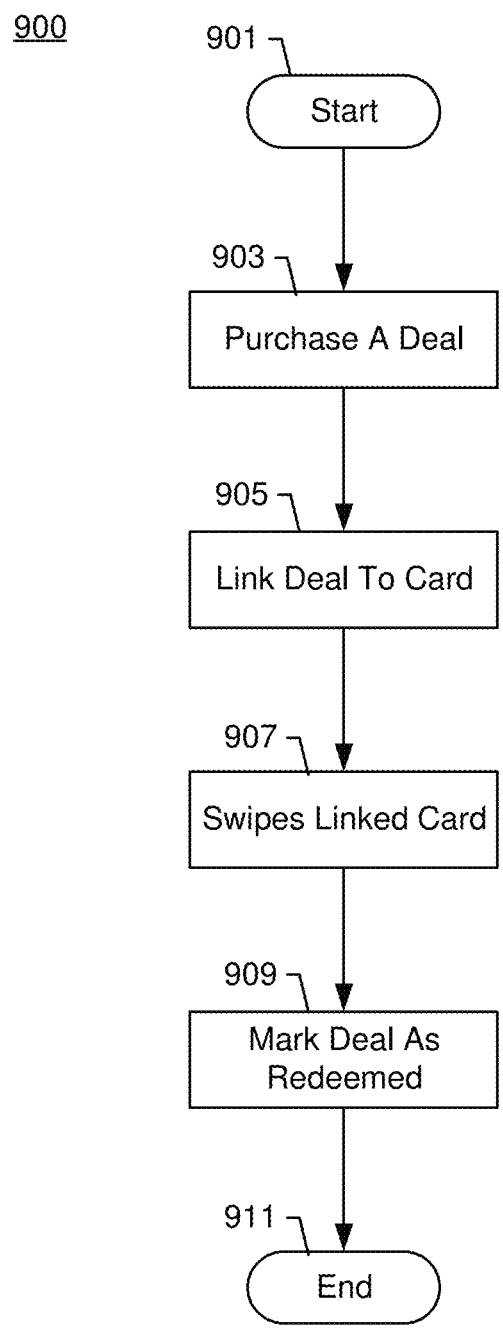
Figure 10:
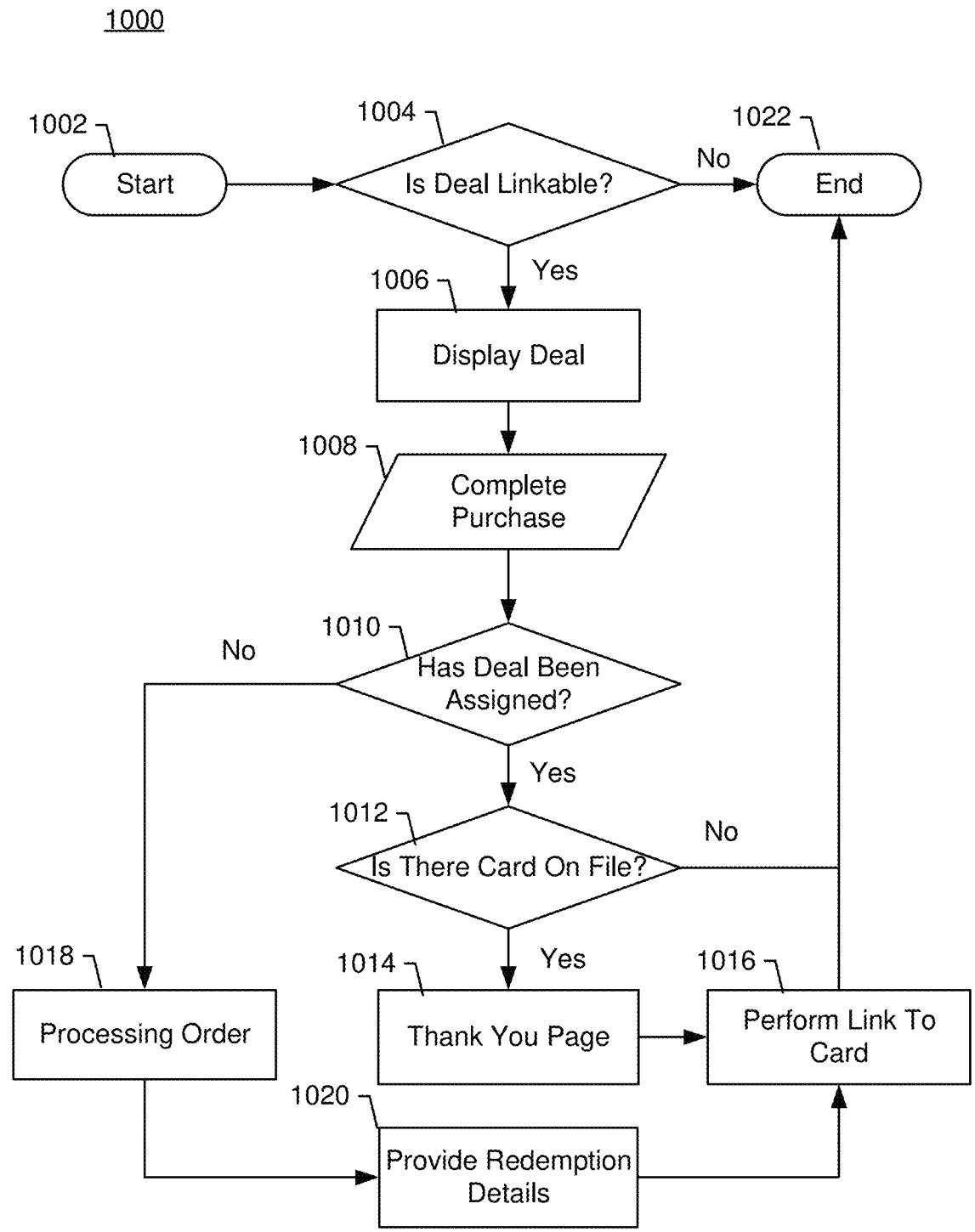

Having thus described embodiments of the invention in general terms, reference will now be made to the accompanying drawings, which are not necessarily drawn to scale, and wherein:

FIG. 1 is an exemplary system architecture diagram of an network database system in accordance with some embodiments of the present invention;

FIG. 2 is an exemplary schematic diagram of a server according to some embodiments of the present invention;

FIG. 3 is an exemplary flow chart illustrating interactions between various components according to some embodiments of the present invention;

FIG. 4 is an exemplary flow chart illustrating an exemplary method in accordance with some embodiments of the present invention;

FIG. 5 is an exemplary flow chart illustrating an exemplary method in accordance with some embodiments of the present invention;

FIG. 6 is an exemplary flow chart illustrating an exemplary data flow in accordance with some embodiments of the present invention;

FIG. 7 is an exemplary flow chart illustrating an exemplary data flow in accordance with some embodiments of the present invention;

FIG. 8 is an exemplary flow chart illustrating an exemplary data flow in accordance with some embodiments of the present invention;

FIGS. 9-10 illustrate various exemplary workflows in accordance with some embodiments of the present invention; and FIGS. 11-28 illustrate various exemplary user interfaces in accordance with some embodiments of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the invention relate generally to improved methods, apparatuses, and computer program products for linking a promotion or deal to a credit card.

In particular, the various embodiments provide linking a dataset (such as a promotion) in a network database to a physical instrument (such as a credit card) having an instrument identifier (such as a unique character string that identifies the credit card), and updating the linked dataset based on a transmission indication associated with the physical instrument. In this regard, embodiments of the present invention provide methods, apparatuses, and computer program products for receiving a transmission indication identifying a physical instrument based on the instrument identifier.

In some embodiments, improved methods, apparatuses, and computer program products are provided for enabling a system to allow a consumer (e.g., a user of a promotion and marketing system mobile app) to purchase a promotion, and instead of a conventional delivery method (e.g., providing a voucher configured for printing or display on the mobile device), links/associates the promotion (or an indication therefore) comprising at least a value, with a credit card associated with the consumer or consumer account. In practice, after providing the indication to purchase the promotion, the consumer may be given an option to link the newly purchased promotion to a credit card or it may happen automatically. The system then links, for example, in a database, an indication of the promotion, an associated value, and an indication of the credit card. When the consumer then uses the credit card at the merchant, the system may be configured to receive an indication from a payment processing system (Visa®) and transmit information back related to promotion (e.g., indicative to the discount, etc.) such that (i) in one embodiment the consumer may only be charged the discounted amount; or (ii) the consumer may be charged the full amount and receive a credit for the discount associated with the promotion. In any embodiments, the user may also receive a text message or push notification indicating that the promotion has been applied.

Systems structured in accordance with various embodiments of the invention are configured to provide user with the flexibility of updating a dataset in a network database based on interactions of a physical instrument. For example, a dataset may store information related to a promotion provided by Groupon®. In this example, the dataset may indicate one or more values, such as a promotion value and a purchase value. The physical instrument may be, for example, a credit card, which may have an instrument identifier, such as a unique character string that identifies the credit card. The Groupon promotion offering system may receive a data linking query and associate the promotion dataset with the instrument identifier. In this example, when the credit card is used to complete a transaction, the Groupon promotion offering system may determine whether a promotion is available to be applied for the transaction.

Further, systems structured in accordance with various embodiments of the invention are compatible with existing network database systems, and provide support for future network architecture updates/upgrades. Continuing from the Groupon® example above, the Groupon promotion offering system may specify how a dataset announces that it supports data linking, expose an action that allows a user to link or unlink a dataset with a physical instrument, communicate information relating to the dataset to various modules of the network database system, and define system behavior related to the dataset state, including specific traits if a particular module of the network database system does not support data linking.

In contrast, other systems that do not incorporate the inventive embodiments discussed herein ("deficient systems") may be plagued by limitations and inefficiencies. For example, some deficient systems do not use any instrument identifier to authenticate the physical instrument, which may compromise data integrity. Continuing from the previous example, such deficient systems may rely on a paper voucher for promotion redemption. Further, such deficient systems may only allow the user to redeem the promotion once, regardless of whether the promotion value has been completely redeemed. Some other deficient systems do not track the interactions of the physical instrument in real-time, which further hinders the system's ability to facilitate data linking and transmission.

The inventors have identified that system resources can be easily exhausted, and failure to keep data up-to-date may compromise the data integrity of network databases. Details of various embodiments of the present invention are described herein.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearable devices, personal computers, enterprise computers, and the like.

The term "user input" refers to data that is provided to a client device by a user, either directly or indirectly, via one or more input devices. The input device may be a number pad, a keyboard, a cursor control device (such as a mouse), a joystick, touch screen display, remote control, or any other device operative to interact with the client device.

The term "network database" refers to a collection of data in a computer network that is organized so that its content can easily be accessed, managed, and updated. Network databases contain aggregations of datasets, such as product inventories, product catalogs, sales transactions, and customer profiles. Network databases may be classified according to its dataset type, such as bibliographic, full text, numeric, and images. Network database may also be classified based on its organizational structure, such as relational database, distributed database, cloud database, Not Only SQL (NoSQL) database, object-oriented database, and graph database.

The term "dataset" refers to a collection of related, discrete items of data that may be accessed individually, or in combination or managed as a whole entity. Usually, a dataset is organized into some type of data structure. In a database, for example, a dataset might contain a collection of business data. For example, a dataset may include information related to the category, price, distance, and expiration date of a promotion. The term "client account" refers to a unique dataset storing information (e.g., name, password, address) associated with a particular client. For example, a client account may store information related to a customer who is interested in purchasing a promotion.

The term "query" refers to a request associated with a database. A query may be a select query, which requests the retrieval of relevant data in the database. A query may also be an action query, which asks for additional operations on the data, such as insertion, updating, or deleting. A database query may be coded in a query language, which enables the operations on data interactively from the database, without having to write a complex program.

The term "data linking query" refers to an action query that asks for linking and connecting relevant information. For example, a "data linking query" could be a request to link a promotion deal to a credit card. A "dataset pointer" may be generated in response to a data linking query. A "dataset pointer" may take various forms. For example, a dataset pointer may be in the form of a table, which may cross reference the physical addresses of the datasets to be linked.

The term "physical instrument" may include one or more of credit cards, debit cards, key fobs, smart cards, or similar other devices. It may also include contactless payment systems, such as smartphones and other mobile devices that use radio-frequency identification (RFID) or near field communication (NFC) for making secure payments by way of an embedded chip and antenna. Each physical instrument may have a unique "instrument identifier," which distinguishes the physical instrument from others. An instrument identifier may be a numeric, alphabetic, or alphanumeric character string that identifies the physical instrument. For example, if the "physical instrument" is a credit card, the "instrument identifier" could be a credit card ID.

The term "promotion" may include, but is not limited to, any type of offered, presented or otherwise indicated reward, discount, coupon, credit, deal, incentive, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. In a database, the "promotional value" may be stored as a "restricted value" in a dataset. The promotion may also have a "residual value," reflecting the remaining value of the promotion after redemption. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

The term "impressions" may include, but is not limited to, a hyperlink, an electronic communication, a digital text message, an electronic application alert, mobile applications or the like, that can be electronically presented on a client device and indicate one or more promotions.

Example System Architecture

Methods, apparatuses, and computer program products of the present invention may be embodied by any of a variety of devices. For example, methods, apparatuses, and computer program products of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system within which embodiments of the present invention may operate. Users may access the network database platform 119 via a communication network 107 (e.g., the Internet, Wi-Fi, LAN, WAN, or the like) using client devices 101A-101N. The network database platform 119 may also receive electronic communications from the transmission server 105 and/or a terminal device 103.

The network database platform 119 may comprise a server 115 in communication with one or more network databases 117A-117N. The server 115 may comprise a link query analyzer 109, a database controller 111, and a transmission decipher 113.

The server 115 may be embodied as a computer or computers. The server 115 may provide for receiving of electronic data from various sources, including but not limited to the client devices 101A-101N and transmission server 105. For example, the server 115 may be operable to receive and process data linking queries provided by the client devices 101A-101N, and transmission indications from the transmission server 105. The server 115 may provide means for the generation and providing of data linking.

The client devices 101A-101N may be any computing device as defined above. Electronic data received by the server 115 from the client devices 101A-101N may be provided in various forms and via various methods.

In some preferred and non-limiting embodiments, one or more of the client devices 101A-101N is a mobile device, such as a smart phone or tablet. The one or more client device may execute an "app" to interact with the server 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via Application Programming Interfaces (APIs) provided by the mobile device operating system.

In some embodiments, the client devices 101A-101N may interact with the server 115 via a web browser. The client devices 101A-101N may also include various hardware or firmware designed to interact with the server 115.

The network databases 117A-117N may be embodied as a data storage device such as a network attached storage (NAS) device or devices, or as a separate database server or servers. The network databases 117A-117N may include datasets related to promotions and instrument identifiers. For example, the network databases 117A-117N may include, without limitation, product information, promotional value, purchase information and/or the like.

An example of a data flow for exchanging electronic information among one or more client devices 101A-101N and the network database platform 119 is described below.

In the depicted embodiment, the server 115 may utilize the database controller 111 to generate a dataset associated with the client account. The dataset may further include a restricted value. The server 115 may transmit an impression of the dataset to one or more client devices 101A-101N via the communication network 107.

The one or more client devices 101A-101N are configured to generate a data linking query associated with the dataset. The data linking query describes one or more commands from the one or more client devices 101A-101N to the network database platform 119 to link the dataset with an instrument identifier associated with a physical instrument.

The data linking query may be transmitted to the network database platform 119 via the communication network 107. The network database platform 119 may provide the data linking query to the server 115. The server 115 may utilize the link query analyzer 109 to determine the relevant dataset and instrument identifier based on the data linking query, and utilize the database controller 111 to identify the relevant dataset and instrument identifier in network databases 117A-117N. The server 115 may also use the database controller 111 to generate a dataset pointer that connects the dataset with the instrument identifier.

When the physical instrument having the instrument identifier contacts the terminal device 103 to complete a transmission or transaction, the terminal device 103 may transmit an electronic signal to the transmission server 105, which may in turn deliver a transmission indication to the network database platform 119. A terminal device 103 may be a device, a system of devices, or a module operable to process or communicate in relation to a payment, such as a point-of-sale ("POS") machine, a mobile payment processing system, a cellular phone, a laptop, any intermediary device that could communicate with a POS machine, or the like. In some embodiments, the physical instrument is a credit card, and the terminal device is a POS machine. When the credit card is swiped at the POS machine, the POS machine transmits a signal to the transmission server 105.

In some embodiments, the terminal device 103 may be a part of a contactless payment system, which may use radio-frequency identification (RFID) or near field communication (NFC) for making secure payments by way of an embedded chip and antenna, for example, which enables consumers to wave their card, fob, or handheld device over a reader at the point of sale terminal.

Upon receiving the transmission indication, the server 115 may utilize the transmission decipher 113 to identify a partial amount associated with the transmission indication. The server 115 may further utilize the database controller 111 to update the dataset based on the transmission indication, and output a transmission notification indicating the updated dataset to one or more client devices 101A-101N.

In some embodiments, the server 115 may utilize the database controller 111 to determine whether the identified dataset is linkable. In response to determining that such dataset is not linkable, the server 115 may output an electronic notification to one or more client devices 101A-101N via the communication network 107, indicating that the data linking query cannot be completed.

Example Apparatus for Implementing Embodiments of the Present Invention

The server 115 may be embodied by one or more computing systems, such as apparatus 200 shown in FIG. 2. The apparatus 200 may include processor 202, memory 204, input/output circuitry 206, communications circuitry 208, link query circuitry 210, transmission circuitry 212, and database circuitry 214. The apparatus 200 may be configured to execute the operations described above with respect to FIG. 1 and below with respect to FIGS. 3-5. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Link query circuitry 210 includes hardware configured to process data linking queries. The link query circuitry 210 may utilize processing circuitry, such as the processor 202, to perform these actions. The link query circuitry 210 may receive data from the transmission circuitry 212 and the database circuitry 214, and send data to the communications circuitry 208.

In some embodiments, the link query circuitry 210 may include a separate processor, specially configured Field Programmable Gate Array (FPGA), or Application Specific Integrated Circuit (ASIC). In some implementations, the transmission circuitry 212 and the database circuitry 214, described below, may be sub-circuitries belonging to link query circuitry 210. The link query circuitry 210 may be implemented using hardware components of the apparatus configured by either hardware or software for implementing the functions described herein.

The transmission circuitry 212 includes hardware configured to receive transmission indications associated with physical instruments. The transmission circuitry 212 may utilize processing circuitry, such as the processor 202, to perform these actions. However, it should also be appreciated that, in some embodiments, the transmission circuitry 212 may include a separate processor, specially configured Field Programmable Gate Array (FPGA), or Application Specific Integrated Circuit (ASIC) for performing the functions described herein. The transmission circuitry 212 may be implemented using hardware components of the apparatus configured by either hardware or software for implementing these planned functions.

The database circuitry 214 includes hardware configured to manage one or more network databases. The database circuitry 214 may utilize processing circuitry, such as the processor 202, to perform these actions. However, it should also be appreciated that, in some embodiments, the database circuitry 214 may include a separate processor, specially configured Field Programmable Gate Array (FPGA), or Application Specific Integrated Circuit (ASIC) for performing the functions described herein. The database circuitry 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Operations for Implementing Embodiments of the Present Invention

In some embodiments, the system may be configured to facilitate data linking and transmission, some exemplary processes of which are shown in FIGS. 3-5.

FIGS. 3-5 illustrate example methods that may be executed by one or more apparatuses, for example by processor 202, memory 204, input/output circuitry 206, communications circuitry 208, link query circuitry 210, transmission circuitry 212, and database circuitry 214 of FIG. 2, for providing data linking and transmission thereof, in accordance with some embodiments discussed herein.

1. Providing Data Linking to a Physical Instrument

FIG. 3 illustrates a flow diagram depicting an example of a process 300 for facilitating data linking and transmission.

The process 300 starts at block 301. At block 303, an apparatus, such as apparatus 200, may be configured to receive a dataset generation request from a client device, such as one of the client devices 101A-101N. Upon receiving the dataset generation request, the apparatus 200 may be configured to generate a dataset associated with a client account. The dataset may indicate a restricted value.

In some embodiments, the dataset generation request indicates the completion of a transaction. For example, when a customer, John, purchases a promotion via a mobile application on a mobile phone, the apparatus (such as a server) may receive a dataset generation request from the mobile phone, which requests the purchased promotion to be added to John's account in the database. The purchased promotion could be, for example, a restaurant promotion of 20 dollars for 40 dollars' worth of cuisine at a participating restaurant. In this example, the dataset generated by the server may indicate 40 as the restricted value.

At block 305, the apparatus, such as apparatus 200, may be configured to receive a data linking query from a client device, such as one of the client devices 101A-101N. The data linking query may request establishing connections between the dataset and an instrument identifier. In response to the data linking query, the apparatus 200 may update the dataset to map the dataset to the instrument identifier.

In some embodiments, the data linking query links a credit card to a purchased promotion. Continuing from the previous example, the customer, John, may be presented an option to link the purchased promotion to a credit card in the mobile application interface. When John chooses to link the purchased promotion to the credit card, the server may create a credit card ID in the database that identifies the credit card, and update John's account to indicate that the purchased promotion is now linked to John's credit card.

At block 307, the apparatus, such as apparatus 200, may receive a transmission indication from another server, such as transmission server 105. The transmission indication may indicate a transmission between the physical instrument and a terminal device, and may include a partial amount associated with the transmission.

In some embodiments, the transmission indication indicates a transaction associated with the promotion. Continuing from the previous example, the terminal device may be a point-of-sale machine, and the transmission indication may indicate a transaction by the linked credit card. The transmission indication may indicate an amount that is redeemed using the credit card. Upon receiving the transmission indication, the server may update John's account based on the amount that has been redeemed. For instance, when John uses the linked credit card to make a purchase of 25 dollars' worth of promotion at the participating restaurant via a point-of-sale device, the server may receive an indication associated with this transaction. In response, the server may update John's account, reflecting that 25 dollars' worth of the 40 dollars have been redeemed, and may transmit a request to the bank associated with the linked credit card for a reimbursement.

At block 309, the apparatus, such as apparatus 200, may output a redemption indication to one of the client devices 101A-101N. Such redemption indication may include, for example, the restricted value, the partial value, and any residual value that is left after deducting the partial value from the restricted value.

Continuing from the previous example, John may receive a push notification from the mobile application on the mobile phone indicating 25 dollars' worth of the promotional value that has been redeemed in the transaction. The push notification may also indicate the residue promotional value, which is 15 dollars in this case.

The process 300 ends at block 311.

2. Determining Whether Promotion and Card are Linkable

FIG. 4 illustrates a flow diagram depicting an example of a process 400 for determining whether a dataset can be linked to a physical instrument.

The process 400 starts at block 402. At block 404, an apparatus, such as apparatus 200, may determine whether a dataset is linkable to a physical instrument. For example, the apparatus, such as a server, may determine whether a restaurant promotion, offered by a merchant, can be linked to a credit card.

In response to determining that the dataset is not linkable, the apparatus, such as apparatus 200, may generate an electronic notification at block 406, and transmit the electronic notification to one of the client devices 101A-101N.

The electronic notification may indicate that the dataset is not linkable. Continuing from the previous example, when the server determines that the restaurant promotion is not linkable to a credit card, the server may provide an electronic indication to the client device that a card-link option is not available.

In response to determining that the dataset is linkable, the apparatus, such as apparatus 200, may further determine whether there is an available instrument at block 410. If there is no available instrument, the apparatus, such as apparatus 200, may request a new instrument identifier at block 412.

Continuing from the previous example, when the server determines that the restaurant promotion is linkable, the server may proceed with determining whether a customer has a credit card in the system that the restaurant promotion can be linked to. When the server determines that the system does not have any credit card associated with the customer, the server may then present an option in the mobile application that allows the customer to add a credit card.

If the apparatus, such as apparatus 200, determines that an instrument identifier is available at block 410, the apparatus, such as apparatus 200, may further generate a dataset pointer at block 414 based on the data link query. As discussed above, the dataset pointer maps the identified dataset to an instrument identifier.

Continuing from the previous example, when the server determines that (1) the restaurant promotion is linkable, (2) the customer has a credit card available to be linked to the restaurant promotion, and (3) the customer requests the credit card to be linked to the restaurant promotion, the server may map the promotion to rules associated with card-linked deals so that the credit card can be used to redeem the promotion.

The process 400 ends on block 416.

3. Determining Whether a Linked Promotion has Expired

FIG. 5 illustrates a flow diagram depicting an example of a process 500 for determining whether a linked dataset is still available.

The process 500 starts at block 501. At block 503, an apparatus, such as apparatus 200, may receive a transmission indication, indicating that there is a transmission or transaction associated with a physical instrument having the instrument identifier on a terminal device. The instrument identifier is linked to a dataset in the server.

For example, a user John may have a credit card that is linked to a purchased promotion of 20 dollars for 40 dollars' worth of cuisine at a participating restaurant. The transmission indication may indicate that John has made a purchase using the linked credit card at a point-of-sale machine at the participating restaurant.

In response to receiving a transmission indication at block 503, the apparatus, such as apparatus 200, updates the linked dataset based on the transmission indication at block 505.

Continuing from the previous example, the transmission indication may indicate that John made a 25 dollars' worth of purchase at the restaurant. In response, the server may update John's account, indicating that 25 dollars' worth of promotional value has been redeemed. The server may further generate a request of reimbursement to the bank associated with the linked credit card.

At block 507, the apparatus, such as apparatus 200, may then determine whether the value has been fully redeemed. The value is fully redeemed when the transaction value as indicated in the transmission indication equals to or more than the promotional value of the promotion. Continuing from the previous example, because 25 is less than 40, the server may flag the promotion as not being fully redeemed.

If the apparatus determines that the value is not fully redeemed at block 507, the apparatus may generate a time code associated with the transmission indication at block 511. The time code indicates the system time at which the transmission indication was received at block 503. Continuing from the previous example, the time code may indicate the time at which John made the purchase using the linked credit card at the participating restaurant.

At block 513, the apparatus, such as apparatus 200, may further determine whether a new transmission indication has been received. Continuing from the previous example, the server may determine whether a new purchase associated with the promotion has been made using the linked credit card at the participating restaurant.

If the apparatus, such as apparatus 200, does not receive any new transmission indication, then the apparatus, such as apparatus 200, waits at block 515 until a pre-determined amount of time has passed since the system time indicated by the time code generated at block 511 before ending the process 500 at block 517.

Continuing from the previous example, if twenty-four (24) hours have passed and John made no additional purchase using the linked credit card at the participating restaurant, then the server may flag the promotion as expired, or convert back to non-card-linked promotion (i.e. disconnect the link between the instrument identifier and the dataset), or provide John an option to exchange the card-linked promotion for monetary value.

Referring back to block 507, if the apparatus, such as apparatus 200, determines that the value has been fully redeemed, the apparatus may generate a redemption completion indication at block 509, and transmit the redemption completion indication to one or more client devices, such as client devices 101A-101N.

Continuing from the previous example, if the 40 dollars' worth of promotional value has been fully redeemed, the server may transmit a push notification to the John's mobile device, indicating that the promotion has been fully redeemed.

Referring back to block 513, if the apparatus, such as apparatus 200, determines that there has been new transaction indication at block 513, the apparatus, such as apparatus 200, may proceed with updating dataset at block 505 and determining whether the value has been fully redeemed at block 507. Continuing from the previous example, if an additional purchase has been made at the participating restaurant using the linked credit card, the server may proceed with updating John's account, and determining whether the promotion has been fully redeemed.

The process 500 ends at block 517.

Example Data Flows of the Present Invention

FIGS. 6-8 are exemplary data flow diagrams based on various embodiments of the present invention.

1. Linking Dataset with Physical Instrument

FIG. 6 illustrates an exemplary data flow 600 for linking a dataset with one or more physical instruments.

At step 602, a user device, such as one of the client devices 101A-101N described above with reference to FIG. 1, may request a status check for a dataset in the inventory module. The inventory module is configured to store all available datasets in the system. The inventory module may be embedded through hardware, software, or a combination of hardware and software in the apparatus, such as apparatus 200 described above in connection with FIGS. 1-2.

For example, a user John may click on or otherwise select a promotion via a mobile application on a mobile phone. In response to the selection, the mobile application may request a status check on the selected promotion from the inventory module of the promotion system.

At step 604, the inventory module may return a status of the dataset to the user device. The status can be, for example, whether the dataset has been linked. Continuing from the example above, the inventory module may indicate that the selected promotion has not been linked.

At step 606, the user device may request transmission of a dataset from the inventory module. Continuing from the example above, the inventory module may receive a request to purchase the selected promotion from a mobile application on a mobile phone associated with John.

At step 608, the inventory module may transfer the requested dataset to user device. Continuing from the example above, the inventory module may transfer data associated with the requested promotion to John's mobile phone, indicating that the promotion has been purchased by John and is no longer available in the inventory module.

At step 610, the inventory module may determine whether the dataset is linkable to one or more physical instruments. If the determination is no, the inventory module may transmit an unlinkable indication to the user device at step 612. Continuing from the example above, if the inventory module determines that the purchased promotion is not linkable, then John's mobile phone may receive a notification, via the mobile application, indicating that the purchased promotion cannot be linked to a credit card.

If, at step 610, the inventory module determines that the promotion is linkable, the inventory module may then transmit a request to the linking module to obtain records, such as identifications, associated with one or more physical instruments to be linked with the dataset at step 614. The linking module is configured to perform dataset linking. The linking module may be embedded through hardware, software, or a combination of hardware and software in the apparatus, such as apparatus 200 described above in connection with FIGS. 1-2.

Continuing from the previous example, once the inventory module determines that the purchased promotion is linkable, the inventory module may request credit card information (for example, credit card number, expiration date) associated with John from the linking module.

After the inventory module receives the records (such as identifications associated with one or more physical instruments), the inventory module may link the records to the dataset at block 616. Continuing from the example above, the inventory module may link identification of John's credit card to the purchased promotion.

Further, at step 618, the linking module may transmit to the user device an indication that a data linking has been completed. Continuing from the example above, once the identification of John's credit card is linked with the purchase promotion, the linking module may generate and transmit a linked indication to the mobile application on John's mobile phone.

2. Unlinking Dataset from Physical Instrument

FIG. 7 illustrates an exemplary data flow 700 for unlinking a dataset from a physical instrument.

At step 701, the user device may initiate a status check of a dataset, and the inventory module may return the status at step 703. The status may indicate, for example, whether the dataset has been linked. For example, John may click on or otherwise select a promotion via a mobile application on a mobile phone. In response to the selection, the mobile application may request a status check on the selected promotion from the inventory module of the promotion system. In response to the request, the inventory module may indicate that the selected promotion has been linked.

At step 705, the user device may transmit a request to unlink the dataset to the inventory module. Continuing from the previous example, John may request that the purchased promotion to be unlinked from the credit card via the mobile application on the mobile phone.

At step 707, upon receiving the unlinking request, the inventory module may identify the dataset based on the unlinking request, and may further transfer information related to the dataset to the linking module. Continuing from the previous example, the inventory module identified John's purchased promotion based on the unlinking request, and may transmit information related to the promotion to the linking module.

At step 709, the linking module may transmit unlinking update to the inventory module, and the inventory module may update the dataset to remove the linkage and complete the unlinking from a physical instrument at step 711. Continuing from the previous example, the linking module may transmit updates to the inventory module that the linking between John's credit card and the purchased promotion has been disconnected, and the inventory module may update the status of the purchased promotion, indicating that the purchased promotion is no longer linked to John's credit card.

At step 713, the inventory module may transmit a completion indication to the user device upon successfully unlinking the dataset. Continuing from the previous example, the inventory module may transmit an indication to the mobile application installed on John's mobile device, indicating that the unlinking has been completed.

3. Updating Linked Dataset

FIG. 8 illustrates an exemplary data flow 800 for updating the linked dataset.

At step 802, the card processing unit may request to check the status of a dataset, and the linking module may return the status to the card processing unit at step 804. The status may indicate whether one or more physical instrument is linked to a dataset. The card processing unit can be, for example, the terminal device in association with FIG. 1 above.

For example, when John uses his linked credit card at a terminal to make a purchase associated with the promotion, the card processing unit may transmit a status check request to the linking module, and the linking module may indicate that the credit card is associated with a linked promotion.

At step 806, the card processing unit may then transmit a transmission indication to the linking module, which indicate a transmission associated with a linked physical instrument. The linking module may then transmit a request to update the dataset to the inventory module at step 808, and the inventory module may update the dataset based on the update request at step 810. For example, the request to update may indicate a value associated with the transmission indication from the card processing unit.

Continuing from the previous example, if John uses his credit card to make a 25 dollars' worth of purchase at a promotion restaurant, and John's credit card is linked to a 40 dollars' worth of promotion, the promotion in the inventory module may be updated to reflect that 25 dollars have been redeemed.

At step 812, the inventory module may transmit a return notification to the card processing unit upon completion of the update.

Continuing from the previous example, the inventory module may transmit an indication to the mobile application installed on John's mobile device, indicating that the 25 dollars' worth of promotion has been redeemed.

Example Work Flows of the Present Invention

FIGS. 9-10 depict various exemplary workflows that implement the present invention in accordance with various embodiments of the present invention.

Referring now to FIG. 9, an exemplary workflow 900 for purchasing, linking, and redeeming a card-linked deal is shown.

Workflow 900 starts at block 901. At block 903, a user purchases a deal or promotion. For example, a user Amrut may browse deals on Groupon webpage or mobile app when he spots a deal for "Mike's Pizza: $20 for $40." Amrut may be interested in purchasing the deal, and may click or otherwise select on the deal card to view the deal page. He may click or otherwise select the "Buy" button, and is taken to the checkout page. He places the order and pays $20 for a $40 deal on the Groupon webpage or mobile app. The Groupon webpage or mobile app is then redirected to the "thank you page."

After a user purchases a deal, the workflow may present the user an option to link a card to the deal at block 905. Continuing from the previous example, if the deal is not already linked to Amrut's credit card(s), then a modal or embedded screen is presented to him when he views the "thank you page." In some embodiments, the modal is only displayed one time per order. In some embodiments, the modal is displayed until the user enrolls in the linking program.

After a user links a deal to the credit card, the user may redeem the deal by swiping the linked credit card at block 907. Continuing from the previous example, Amrut may redeem the purchased deal by making a purchase at Mike's Pizza. When Amrut swipes the linked credit card to make a $15 purchase, he may receive a text message or push notification from his bank or the credit card company notifying him that his card was just swiped at Mike's Pizza for $15. He also receives a text message or push notification from Groupon indicating that $15 has been credited back to his credit card, and that $15 of the $40 deal has been depleted.

The process may continue until the full value of the deal has been redeemed, and the deal is marked as redeemed at block 909. Continuing from the previous example, Amrut may make another $25 purchase at Mike's Pizza, and receive a text message or push notification from Groupon indicating that he has redeemed the deal. In some embodiments, as describes above with reference to FIG. 5, Groupon may automatically mark the deal as fully redeemed 24 hours after the first swipe of linked credit card at Mike's Pizza.

The workflow ends at block 911.

Referring now to FIG. 10, an exemplary workflow 1000 for linking a credit card to a deal is shown.

Workflow 1000 begins at block 1002. At block 1004, a system in accordance with some embodiments of the present invention may determine whether a deal is linkable. If the system determines that the deal is not linkable, the workflow 1000 proceeds to block 1022, and the system may display the voucher option for deal redemption.

If the system determines that the deal is linkable, then the workflow proceeds to block 1006, where the system may display the deal through a graphic user interface, as further described below. A user may choose to purchase the deal, and the system may display a checkout page where the user can make a purchase. Once the user places an order, the system may process the order and complete the purchase at block 1008.

At block 1010, the system may determine whether a deal unit has been assigned. A deal unit represents an available deal for a particular promotion in the inventory module. If the deal unit has not been assigned to the order, then the system may display a thank you page indicating that the deal is being processed at block 1018. After the deal unit has been assigned, the user may visit Groupon webpage or mobile app to see redemption details at block 1020. When a user clicks to view the deal and chooses link a credit card to the deal, the system performs card linking at block 1016.

Referring back to block 1010, if the system determines that the deal unit has been assigned, the system then proceeds to determine whether the user has credit card information on file at block 1012. If there is no credit card information on file, then the system proceeds to end the workflow at block 1022. If there is credit card on file, the system then displays a thank you page, where the user is presented with an option to link a credit card to the deal. Once the user confirms the card linking, the system proceeds to block 1016 to perform card linking.

In some embodiments of the present invention, only unviewed deal units (i.e. deals that haven't been converted into vouchers) are linked to the card. In some embodiments, all existing vouchers are suppressed, and all deal units are linked to the card. In some embodiments, the system transmits a text message, email message, or other notification to the user indicating that the card has been linked. In some embodiments, the system may provide redemption instructions for redeeming using linked credit card, and may override redemption instructions for redeeming using voucher.

The workflow 1000 ends at block 1022.

Example User Interfaces of the Present Invention

FIGS. 11-28 illustrate various example user interfaces in accordance with various embodiments of the invention.

1. Linking a Promotion to a Credit Card

Figure 11:
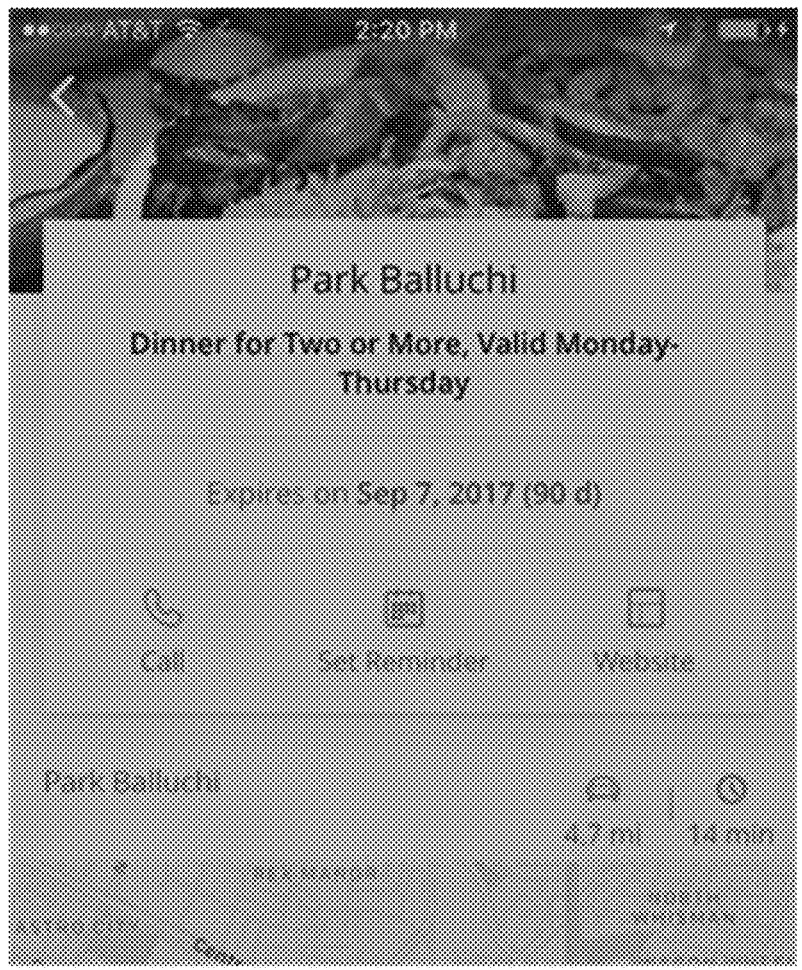
Figure 11:
Figure 11:
Figure 11:
Figure 11:

As illustrated in FIG. 11, an example user interface may prompt the user about linking a dataset to a physical instrument. For example, the dataset indicates a promotion or deal offer, and the physical instrument is a credit card. A user interface of the mobile application may send a notification recommending a user to use his visa card ending in 2342 to redeem a purchased offer. The user may tap or otherwise select the button 1101 to confirm the linking, or tap or otherwise select the button 1103 for skipping the linking.

Figure 12:
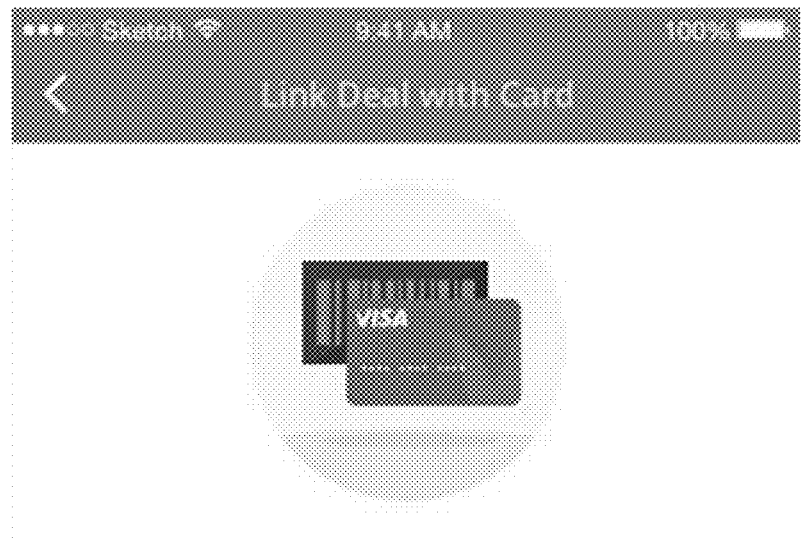
Figure 12:

Once the user selects the button 1101 of FIG. 11, the user interface may illustrate how the linking works as shown in FIG. 12. Continuing from the previous example, the user interface may illustrate to the user that he can link the deal to his Visa credit card on file and use his linked card while visit the merchant to redeem the offer. The user interface may further illustrate that the user would receive a credit back to his Visa credit card account automatically once he redeems the purchased promotion. If the user still wishes to continue with the linking, the user may tap or otherwise select the button 1202.

Figure 13:
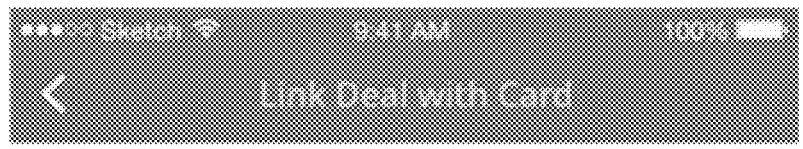
Figure 13:
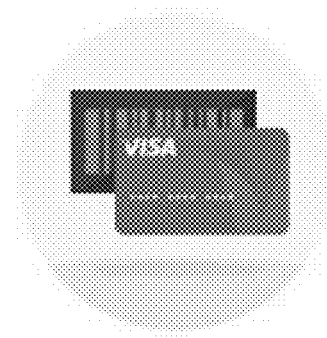
Figure 13:
Figure 13:
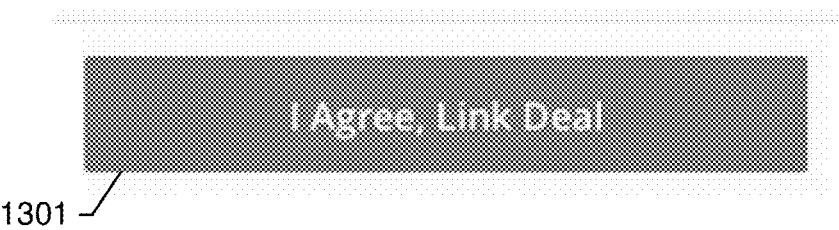

Once the user selects the button 1202 of FIG. 12, the user interface may further allow a user to confirm or change his credit card numbers prior to linking the promotion and the credit card, as illustrated in FIG. 13. Continuing from the previous example, the user may change his credit card number to link the deal, and may tap or otherwise select the "I Agree, Link Deal" button 1301 to confirm the linking. Once the linking is confirmed, the mobile device may send a data linking query as described above.

Figure 14:
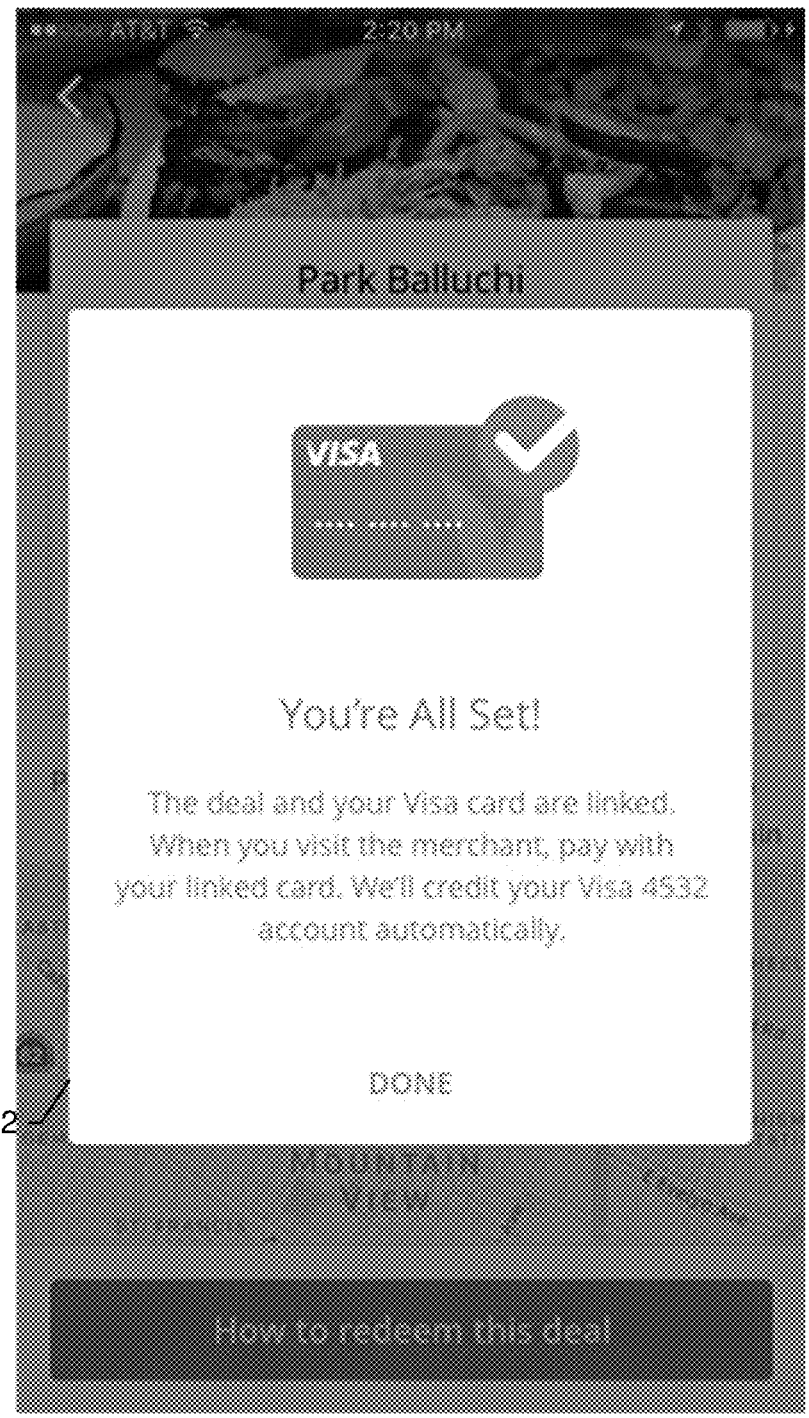

FIG. 14 illustrates an example notification indicating that the dataset linking is successful. Continuing from the previous example, after the user taps or otherwise selects the "I Agree, Link Deal" button 131 to confirm the linking, the user interface may generate a notification 1402 indicating "You're All Set!" and explaining that the linked Visa credit card will be automatically credited when the deal is redeemed using the linked card.

2. Adding Credit Card for Linking

Figure 15:
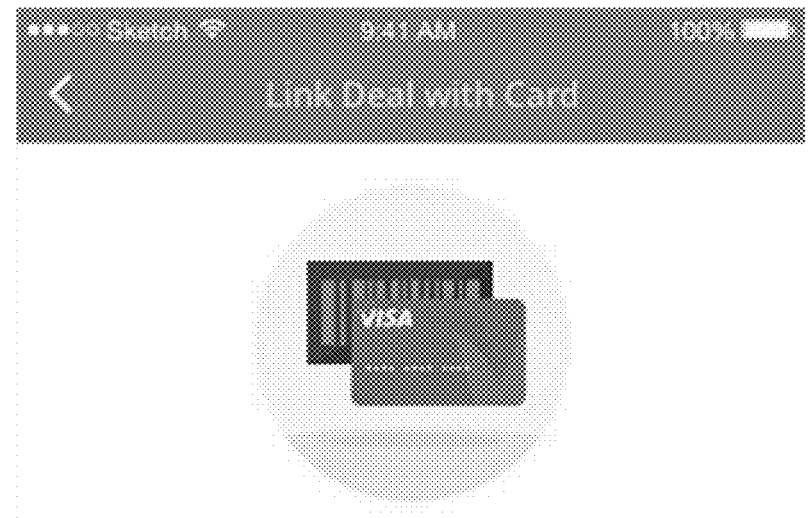

When a user attempts to link a deal to a credit card, but does not have a credit card on file, the user interface may prompt the user that there is no card on file, as shown in FIG. 15. Continuing from the previous example, after the user selects button 1101 of FIG. 11 to confirm the linking, the user interface may warn the user that he does not have a card on file, and provides button 1501 to allow the user to initiate the process of adding a credit card.

Figure 16:
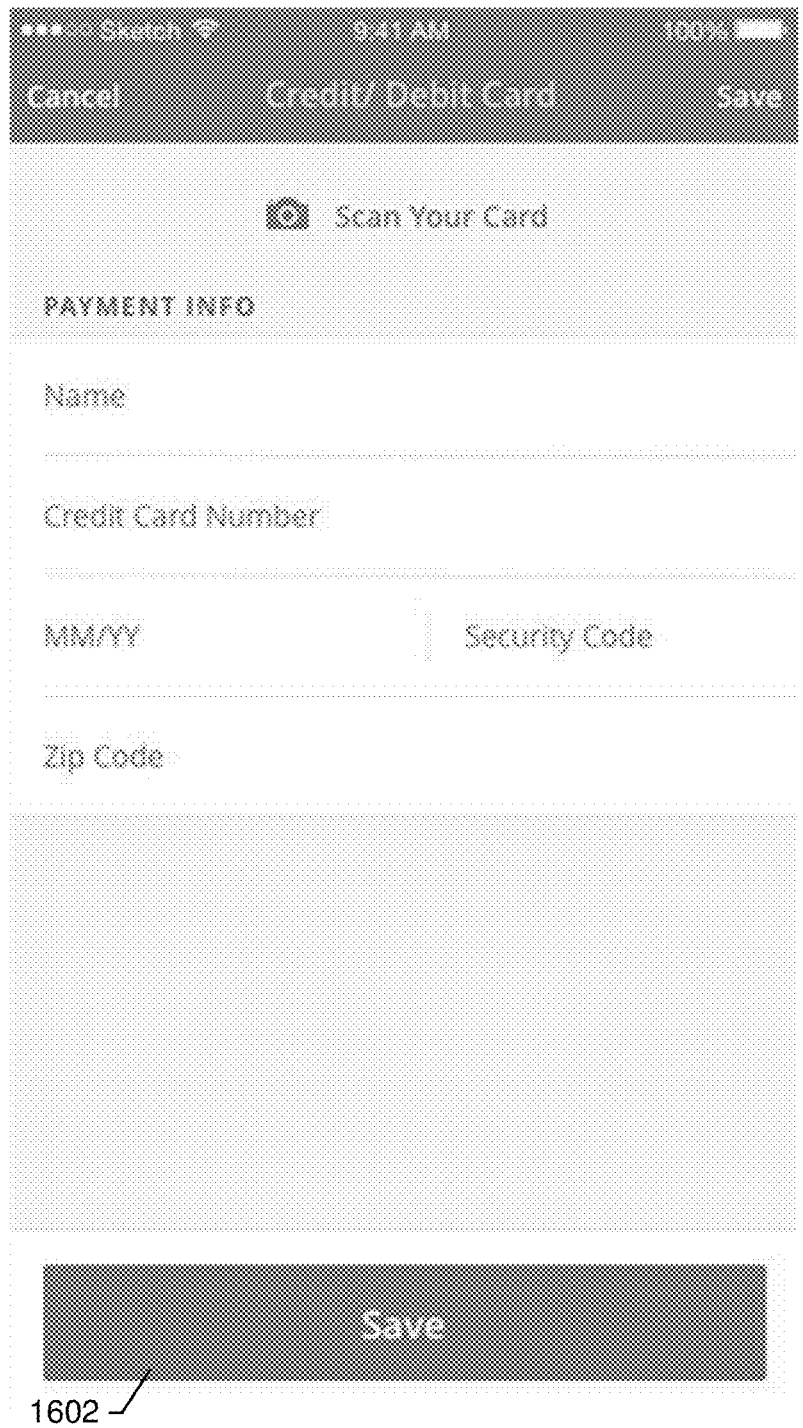

As shown in FIG. 16, the user may input his or her credit card numbers to add a card to the file. Continuing from the previous example, the user interface may allow the user to scan or take a picture of his credit card, or manually type the cardholder's name, credit card numbers, expiration date, security code, and zip code. Once the user completes inputting his credit card information, he may tap or otherwise select the "Save" button 1602 to save the credit card information.

Figure 17:
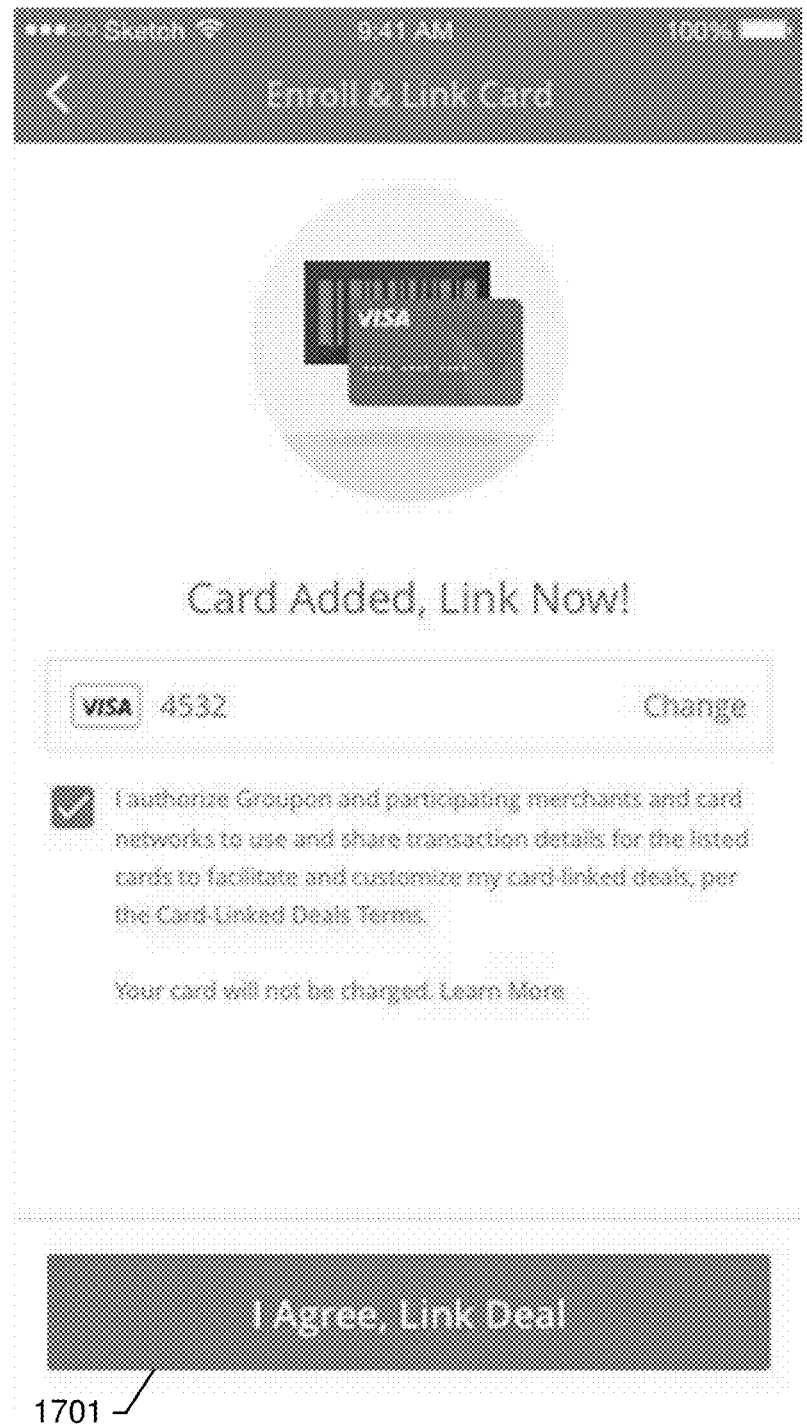

As shown in FIG. 17, once the user added a credit card through the user interface as shown in FIG. 16, the user may further link the newly input credit card information to a deal that the user has purchased. Continuing from the previous example, the user interface may request the user to confirm his authorization for card linking by tapping or otherwise selecting the "I Agree, Link Deal" 1701 to finish the linking process.

3. Redeeming a Promotion Using a Linked Credit Card

Figure 18:
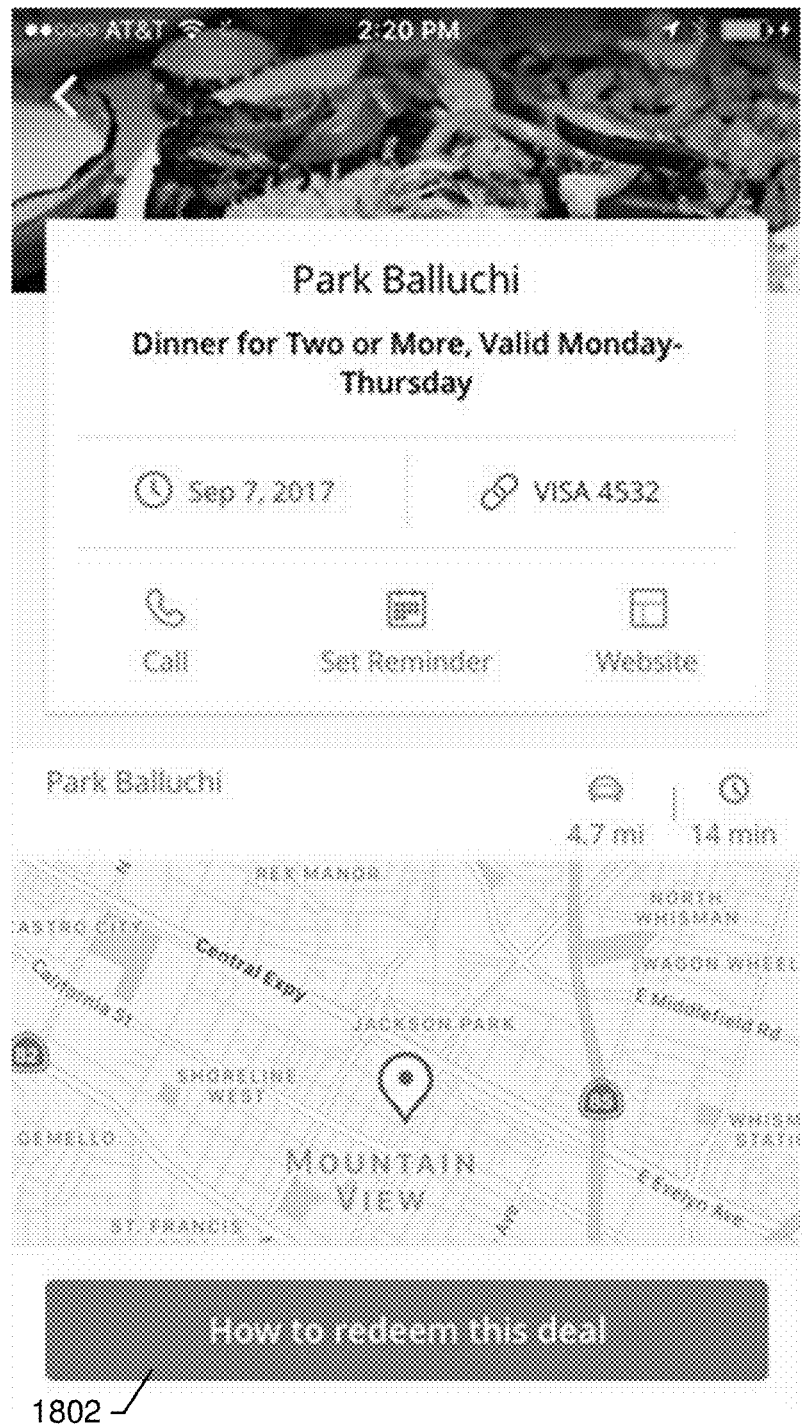

When a user wants to redeem a deal, as shown in FIG. 18, the user interface may display details of a card linked deal. Continuing from the previous example, a user may want to redeem a deal of "Dinner for Two or More" at Park Balluchi restaurant. The user interface may provide details regarding the deal, such as expiration date and location. It may also indicate that the deal has been linked to a Visa credit card ending in 4532. If the user would like more details on how to redeem this deal, he may tap or otherwise select the "How to redeem this deal" button 1802.

Figure 19:
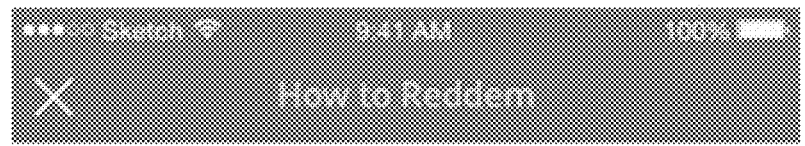
Figure 19:
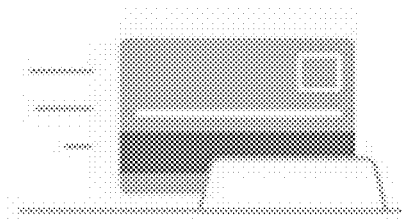

Once the user taps or selects the "How to redeem this deal" button 1802 on the user interface as shown in FIG. 18, the user interface may provide more details on how to redeem the card linked deal as shown in FIG. 19. Continuing from the previous example, the user interface may show the user that he can redeem the deal by swiping his Visa card ending in 4532. It may also provide an option for the user to watch a tutorial video by selecting hyperlink 1901, or add another card to be linked with the deal by selecting hyperlink 1903. It may further provide an option through hyperlink 1905 so that the user may use an electronic voucher instead of the linked credit card to redeem the deal.

Figure 20:
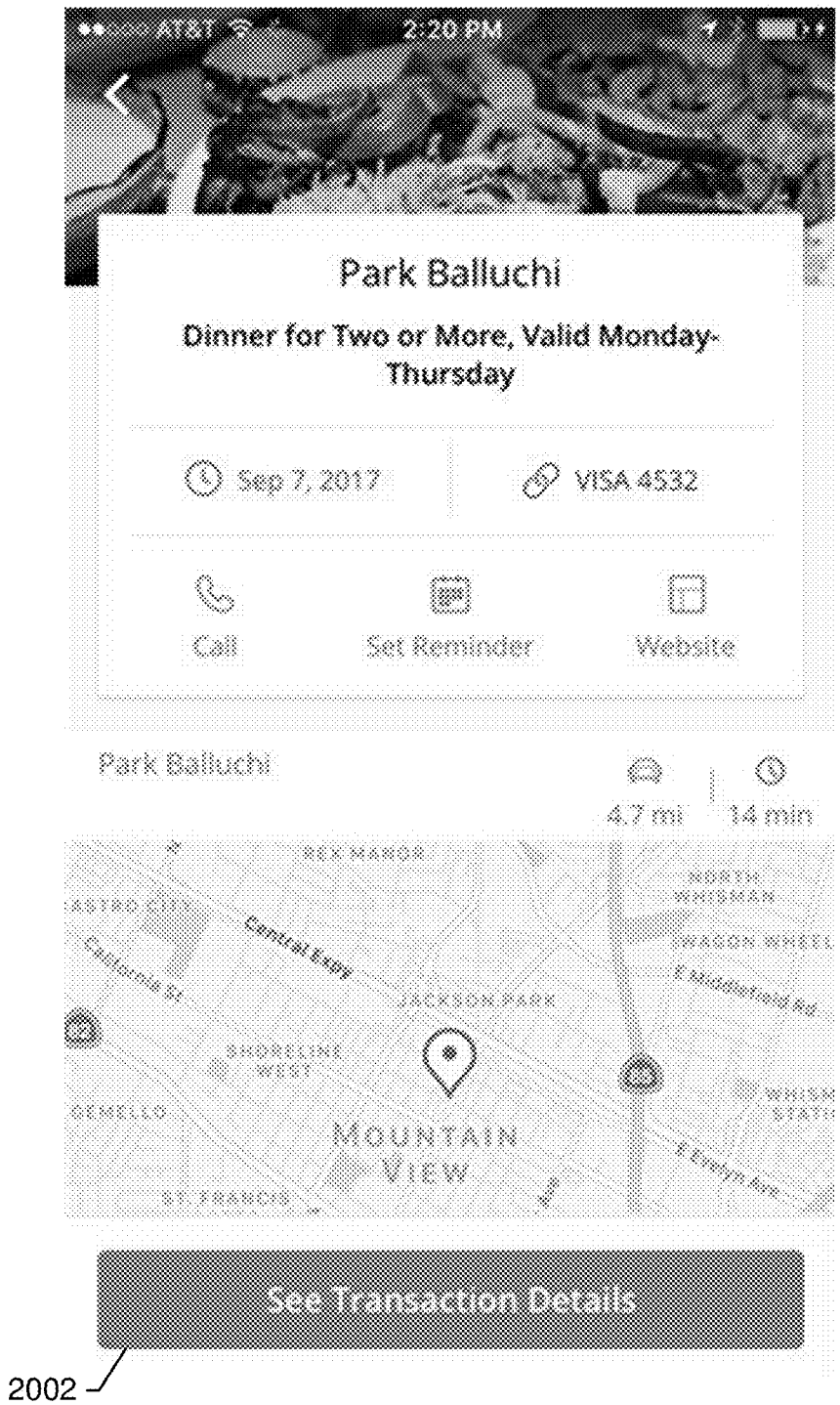

When the user swiped a linked credit card, the user interface may generate a notification, as shown in FIG. 20, indicating the transaction time and location, allowing the user to inspect transaction details. Continuing from the previous example, once the user swipes the Visa credit card ending in 4532 (which is linked to the deal), the user interface may indicate that a transaction has been made, and allow the user to inspect transaction details by tapping or otherwise selecting the "See Transaction Details" button 2002.

Figure 21:
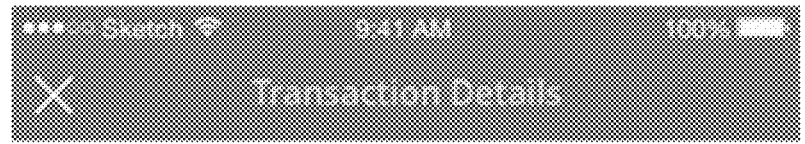

FIG. 21 shows an example transaction details page, where the deal is partially redeemed. Continuing from the previous example, when the user swipes the linked credit card at the Park Balluchi restaurant and redeem $25 worth of the $40 deal ($25 will be issued as credit to the user's linked credit card), the transaction details page shows that the user has $15 worth of the deal to spend on further purchases.

Figure 22:
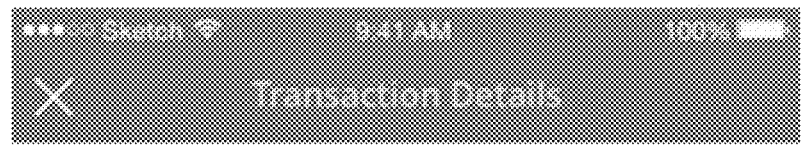

FIG. 22 shows an example transaction details page, where the deal has been fully redeemed. Continuing from the previous example, when the user makes another purchase at the Park Balluchi restaurant and redeems the remaining $15, the transaction details page may indicate that the deal has been fully redeemed.

4. Redeeming a Promotion Using Voucher

Figure 23:
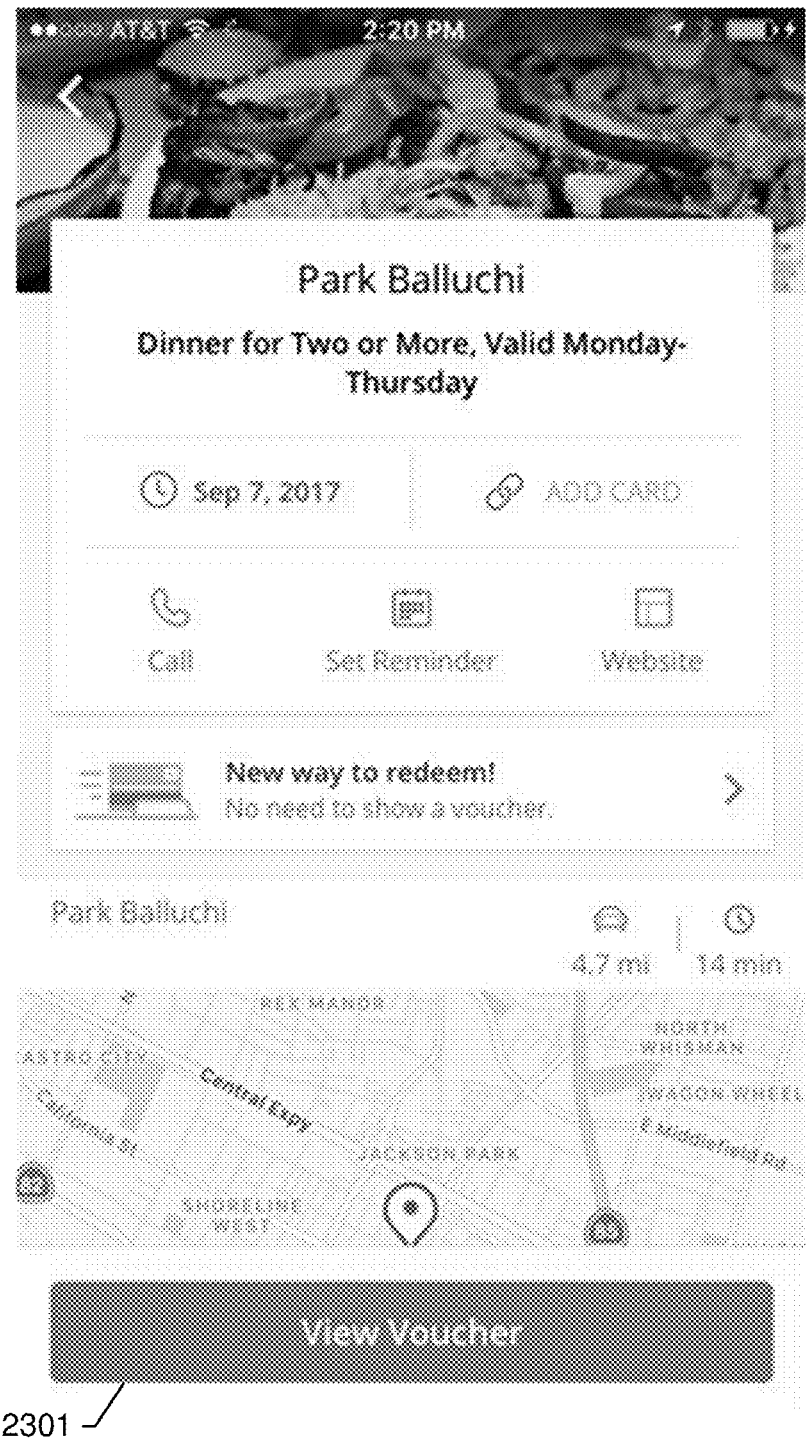

As described above in connection with FIG. 19, the user interface may display an option to use an electronic voucher to redeem the deal instead of through card linking. After the user selects this option, an example user interface is shown in FIG. 23. As an example, the user may prefer to use an electronic voucher instead of linked credit card to redeem the Park Balluchi deal, and may tap or otherwise select the "View Voucher" button 2301 on the user interface to view the electronic voucher.

Figure 24:
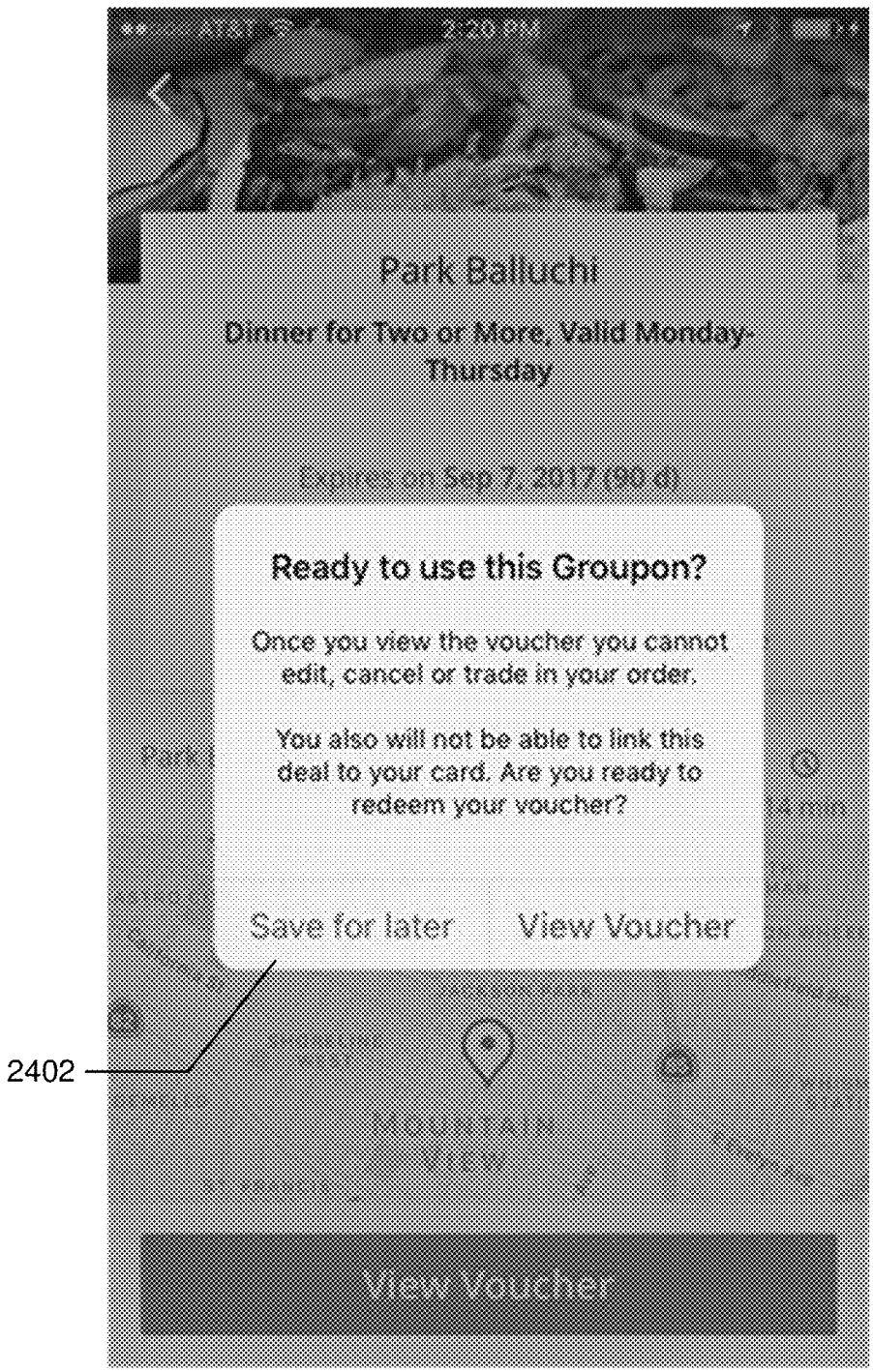

When the user selects "view voucher," the user interface may display a warning message 2402, as shown in FIG. 24, explaining that the order cannot be modified once the electronic voucher is viewed. It may provide the user an option to view the electronic voucher now, and another option to save it for later.

Figure 25:
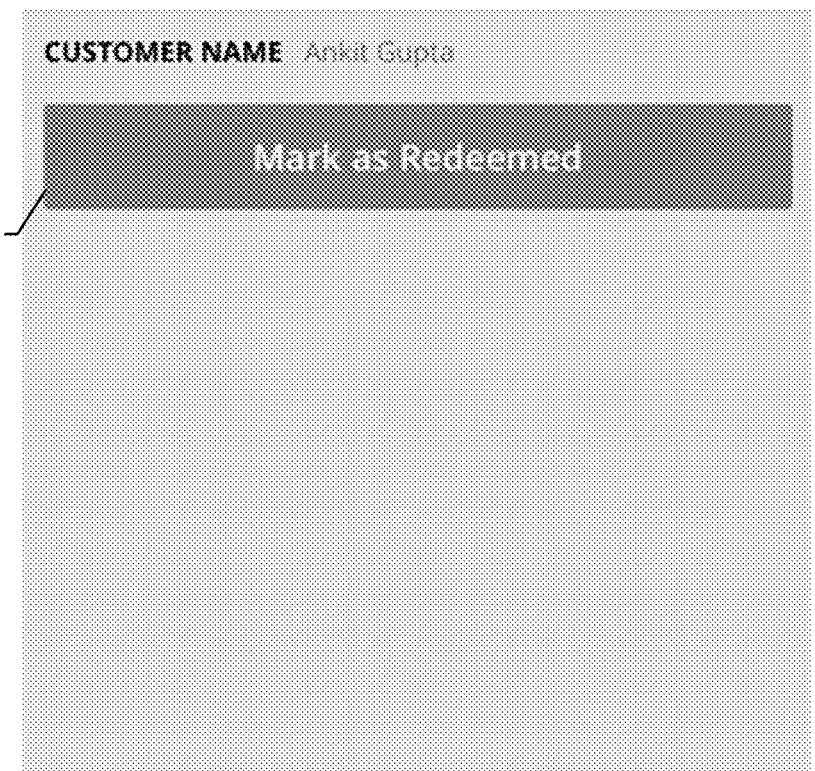

A user interface displaying an example electronic voucher is shown in FIG. 25. For example, the electronic voucher may display the name of the deal, the starting date and the expiration date of the electronic voucher, the bar code of the voucher, the electronic voucher number and the Groupon voucher code. To redeem the voucher, the merchant may scan the voucher bar code or mark the electronic voucher as redeemed by tapping the button 2501.

5. Choosing Redemption Options

Figure 26:
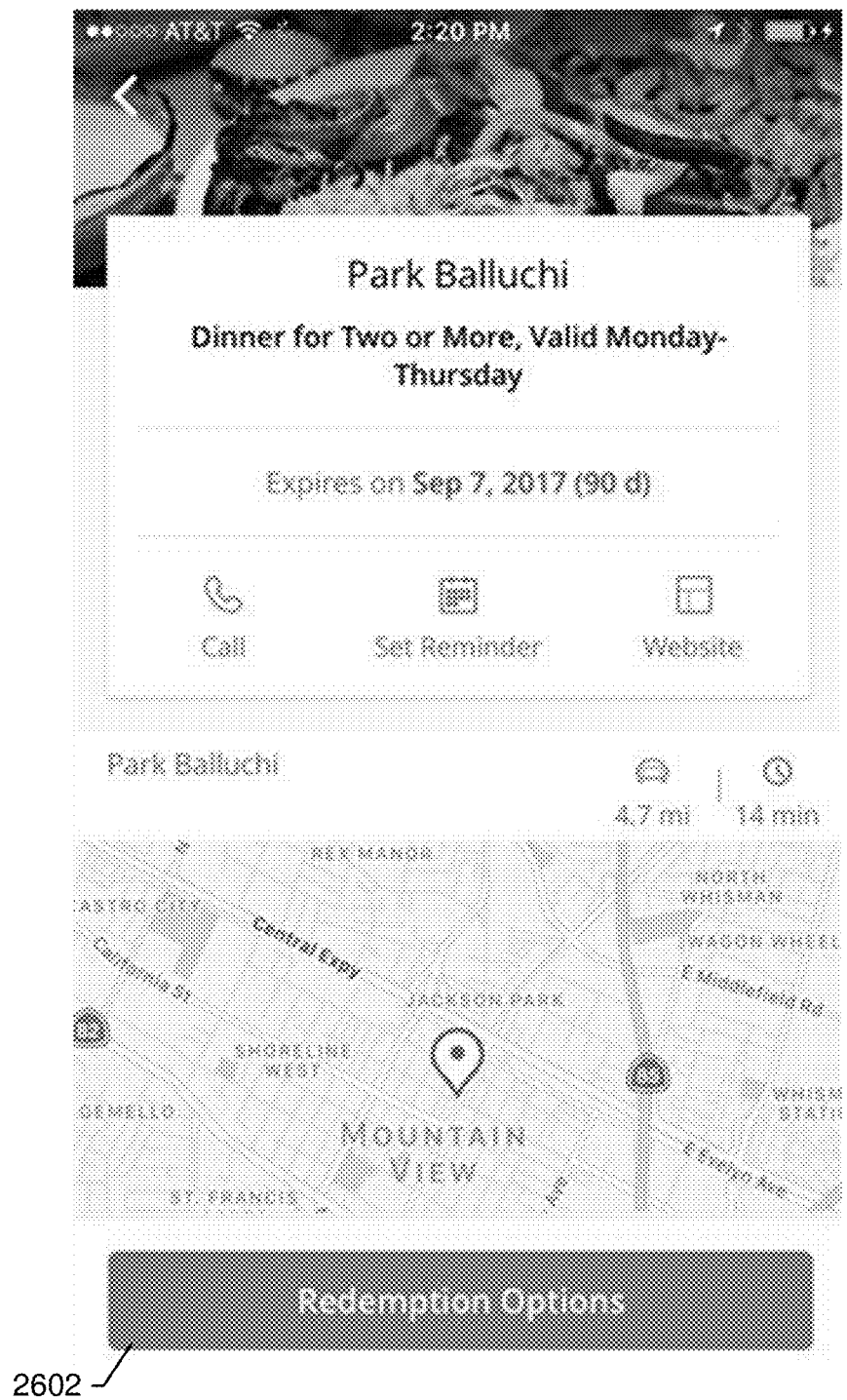

In some embodiments of the present invention, the user interface may allow the user to choose redemption options, as shown in FIG. 26. For example, the user interface may present button 2602 that allows a user to view difference redemption options for the deal.

Figure 27:
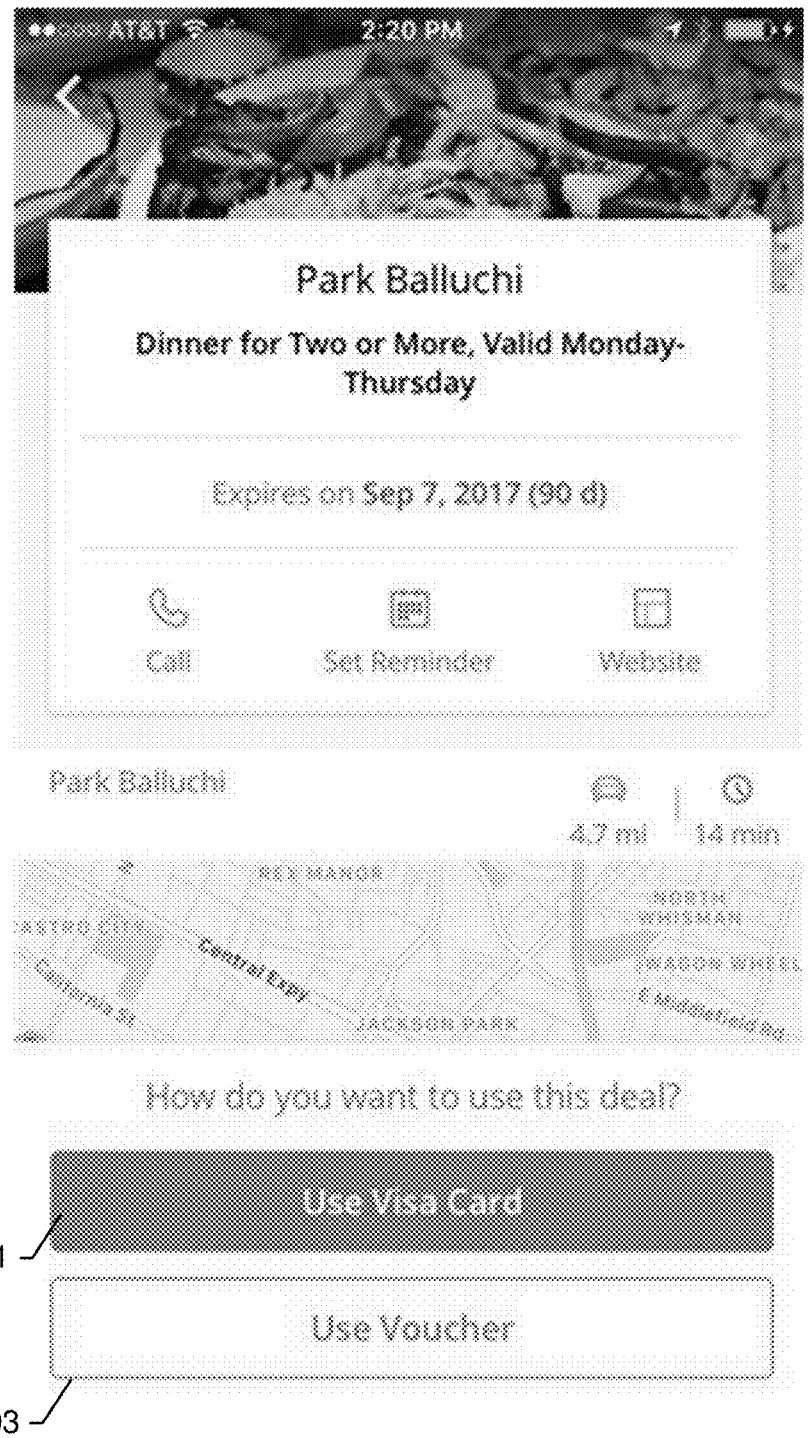

The redemption options can be "use credit card" or "use voucher," as shown in FIG. 27. The user may select the button 2701 to use a visa card to redeem this promotion, or select the button 2703 to use a voucher to redeem this promotion.

Figure 28:
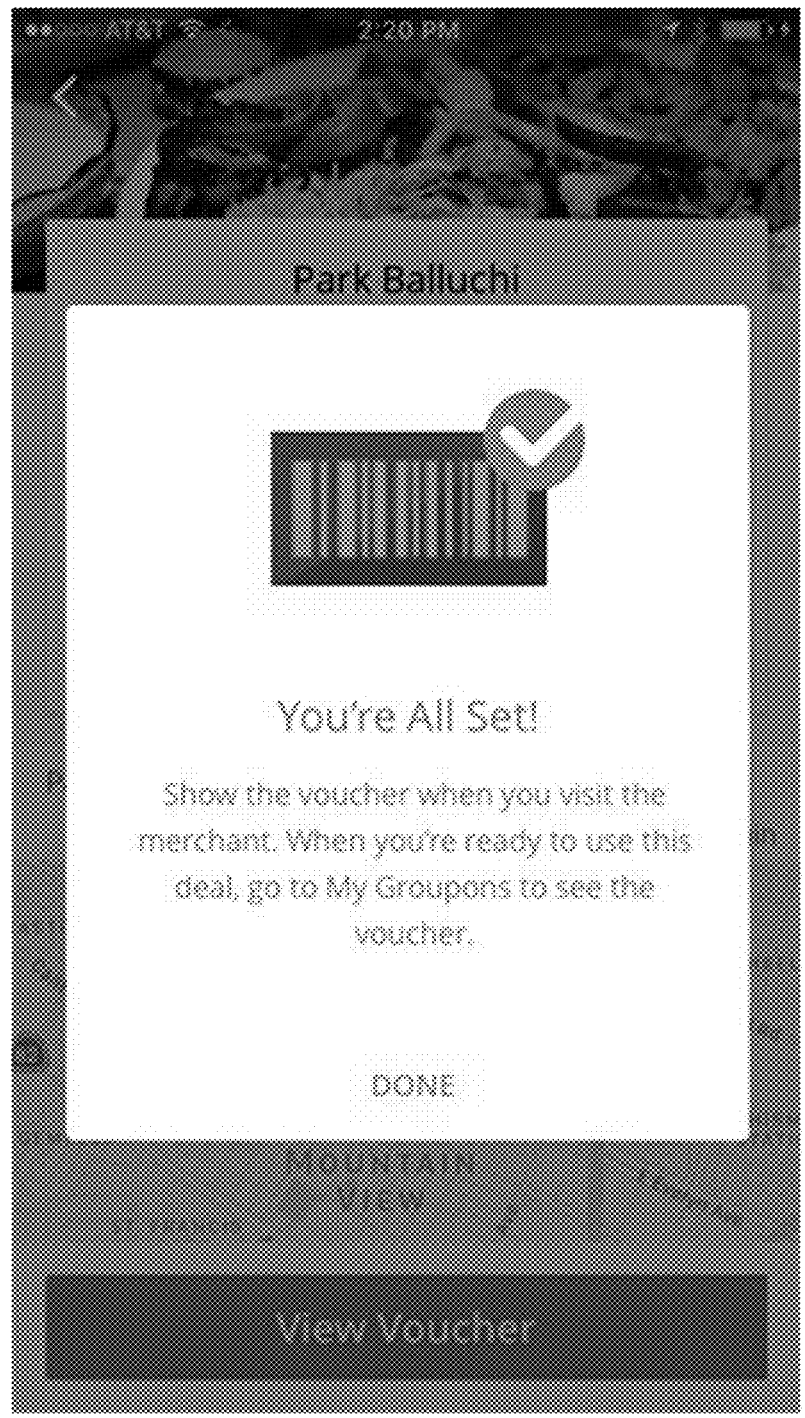

Once the user selects a desired option, the user interface may provide a success notification, as shown in FIG. 28. For example, the user may select to redeem the deal using an electronic voucher, and the user interface may provide details and guidance on how to redeem through the process, as shown in FIGS. 23-25.

Example Datasets of the Present Invention

Various embodiments of the present invention not only provide architecture schema for dataset linking, but also provide compatibility support for integrating various features of the present invention to network databases. In some embodiments, new dataset properties may be added to network datasets to accommodate dataset linking functionalities.

1. Dataset Properties for Redemption Algorithms

For example, in some embodiments, each unit in the inventory module may have one or more values indicating various requirements, statuses, and features for redemption. To accommodate redemption through linked credit card, the following properties may be added to the redemptionPolicy algorithm (which sets out system policy for redeeming a promotion) and the internal Workflow Contents algorithm (which sets out work flows once a promotion is redeemed):

TABLE 1

New Data Properties Related to Redemption Algorithms

| No | Property | Type | Description |
|---|---|---|---|
| 1. | redemptionPolicy .cardLinkedActions .redemptionFulfillmentPeriod | ISO 8601 duration string | Length of time between first swipe and automated redemption. |
| 2. | internalWorkflowContents .<locale> .cardLinkedRedemption- Instructions | Hash of locale (string pairs) | If present, overrides the default unit-level redemption instructions when a physical instrument is linked. The text is localized. |

As shown in Table 1, Dataset Property No. 1 indicates the length of time between the first swipe of linked credit card, and when the deal will be deemed as redeemed automatically. In some embodiment, the system may store a "default" parameter, for example, 24 hours as described above in connection with block 515 of FIG. 5. Dataset Property No. 2 indicates whether the redemption instructions need to be overridden. For example, once a credit card is linked to the promotion (for example, block 616 of FIG. 6), the system may override the default redemption work flow so that a credit card can be used to redeem the promotion.

In some embodiments, programming codes may be used to implement these additional dataset properties. For example, the following programming codes set the redemption window of a linked promotion to close one day after the first swipe:

```
inventoryProduct: {
  claim: {
    claimableForFree: false,
    requiresBillingRecord: true
  },
  internalWorkflowContents: {
    en_US: {
      cardLinkedRedemptionInstructions: "First, swipe
        your card . . . "
    }
  },
  redemptionPolicy: {
    cardLinkedActions: {
      redemptionFulfillmentPeriod: "1D",
    },
    methods: ["default", "link"]
  }
}
```

2. Dataset Properties for Linking Promotions

In some embodiments, when a dataset is updated, additional dataset properties or fields may be included to reflect changes of state. For example, the following dataset properties or fields may be added to each unit (e.g. unit #update):

TABLE 2

New Dataset Properties Related to Each Unit

| No | Property | Type | Description |
|---|---|---|---|
| 1 | redemptionPolicy .methods | String | adds "link" method to redemptionPolicy.methods in unit#fetch, which indicates whether a unit is likable. In some embodiments, the default is not linkable. |
| 2 | redemptionPolicy .cardLinkedActions .redemptionFulfillmentPeriod | String (ISO 8601 Duration) | adds redemptionFulfillment-Period to product |
| 3 | internalWorkflowContents .<locale> .cardLinkedRedemption- Instructions | Text | Custom product-level alternate redemption instructions for the linked state |

As shown in Table 2, Dataset Property No. 1 indicates whether a deal is linked, as described in connection with step 610 of FIG. 6. Dataset Property No. 2 indicates the redemption fulfillment period of the promotion, and Dataset Property No. 3 indicates the alternate redemption instructions (e.g. voucher or linked credit card) for the promotion.

3. Dataset Properties for Database Query

To accommodate dataset linking, in some embodiments, additional dataset properties or fields may be added in a dataset response to network database query. For example, Table 3 below illustrates various properties that may be added:

TABLE 3

New Dataset Properties in Response to Query

| No. | Property | Type | Description |
|---|---|---|---|
| 1. | redemptionDetails .cardLink .firstSwipeAt | ISO Timestamp | Timestamp of first swipe. |
| 2. | redemptionDetails .cardLink .status | String | 'swiped,' 'linked,' 'linkable,' 'not_linkable.' swiped: cannot be unlinked, is partially redeemed linked: linked, no swipe transactions linkable: product and unit support linking but currently in voucher mode not_linkable: unit doesn't allow switching to linked (due to user action). |
| 3. | details .estimatedRemainingBalance | Object | Describes an estimated remaining balance on the unit to redeem. Might be used by other products beyond buy and link. |
| 4. | details .estimatedRemainingBalance .value | A- mount object | Remaining balance for users. |
| 5. | details .estimatedRemainingBalance .source | String | Source of the remaining Balance Enum of ["buy-and-link"] |
| 6. | redemptionDetails .cardLink .linkedClaimId | UUID | Identification of claim |

As shown in Table 3, some embodiments of the present invention may use Dataset Property No. 1 to store a time stamp of the first swipe of a linked instrument, as described in connection with block 511 of FIG. 5. Dataset Property No. 2 may indicate the status of the unit, such as whether the unit is linkable, whether it has been linked, and whether it has been redeemed. When a unit has been linked, Dataset Property Nos. 3, 4, and 5 may indicate the description of estimated remaining balance of the unit, the actual remaining amount and the source of the remaining balance, respectively. Dataset Property No. 6 may further indicate the identification of the card link claim.

In some embodiments, programming codes may be used to implement these additional dataset response properties. For example, the following programming codes indicate that the linked card was first swiped on the midnight of Jan. 1, 2017, and the estimated remaining promotional value of a partially redeemed promotion is $2.00.

```
units: [
  {
    localizedContents: {
      en: {
        locale: 'en',
        redemptionInstructions: "1. Visit the merchant..."
      }
    },
    details: {
      estimatedRemainingBalance: {
        source: "buy-and-link",
        value: {
          amount: 200,
          currencyCode: "USD",
            formattedAmount: "$2.00"
        }
      },
      redemptionDetails: {
        cardLink: {
          firstSwipeAt: "2017-01-01T00:00:00Z",
          status: "swiped",
          linkedClaimId: "11111111-1111-1111-1111-121212121212"
        }
      }
    }
  }
]
```

4. Dataset Properties for Connecting Different Modules

In some embodiments of the present invention, to further support dataset linking, various dataset properties or fields may be used in various modules of the network database system. For example, one or more of the following dataset properties or fields may be added to endpoints of unit #update such that various modules (for example the inventory module and the linking module) of the system may communicate various features related to the dataset linking among each other:

TABLE 4

New Dataset Properties Related to unit#update

| No. | Property | Type | Description |
|---|---|---|---|
| 1 | redemptionDetails .cardLink .linkedClaimId | UUID | Unit should return "linked" status for cardLinkedActions and claim id if cardLinkedActions is non-null. |
| 2 | redemptionDetails .cardLink .status | String | ENUM of ['swiped', 'linked', 'linkable', 'not_linkable'] |
| 3 | redemptionDetails. cardLink.firstSwipe | String or Datetime | Date, time of first recorded swipe by the users. |
| 4 | details .estimatedRemaining- Balance .value | Object | Update amount for estimatedRemainingBalance ({amount, currencyCode}) |
| 5 | details .estimatedRemaining- Balance .source | ENUM | Update the source for estimatedRemainingBalance |

In various embodiments of the present invention, additional dataset properties may be used. As shown in Table 4, Dataset Property No. 1 may indicate whether the unit is linked and the associated claim ID. Dataset Property No. 2 may be an enumerated type value indicating the status of the data linking (e.g. whether the card has been swiped, whether the deal is linkable, etc.). Dataset Property Nos. 3, 4, and 5 may indicate the date and time of the first swipe, the remaining balance, and the source, respectively.

In some embodiments of the present invention, other additional changes may be implemented to accommodate dataset linking. For example, billing modules may be updated to reflect whether a user has set up dataset linking. The billing modules may receive various parameters, such as whether a unit is linkable. The billing modules may also determine whether a particular redemption is eligible for cash back, and may provide an option for the user to claim cash back rewards. Further, the billing modules may accommodate a request for refund while maintain the dataset linking.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for improving network data linking and transmission, the computer-implemented method comprising:
   in response to receiving a dataset generation request associated with a completed transaction indication, triggering generating, in a network database, a first dataset associated with a client account, wherein the first dataset indicates a restricted value from the completed transaction indication;
   determining that the first dataset is linkable to an instrument identifier of a physical instrument associated with the client account;
   in response to receiving, from a client device associated with the client account, a first data linking query to associate the first dataset with the instrument identifier, generating, in the network database, a dataset pointer establishing a data connection between the first dataset and the instrument identifier associated with the physical instrument based on the first data linking query;
   in response to receiving a transmission indication at a transmission indication time indicating a transmission between the physical instrument and a terminal device, triggering updating the first dataset in the network database based on the transmission indication, wherein the transmission indication indicates the instrument identifier and a partial amount associated with the first dataset; and
   in response to expiration of a predetermined redemption period following the transmission indication time, outputting, to the client device, a redemption completion indication indicating that the restricted value associated with the first dataset has been redeemed, wherein the predetermined redemption period is defined by the first dataset.

2. The computer-implemented method according to claim 1, further comprising:
   generating, in the network database, a second dataset associated with the client account;
   receiving, from the client device, a second data linking query to associate the second dataset with the instrument identifier;
   determining whether the second dataset is linkable; and
   in response to determining that the second dataset is not linkable, outputting, to the client device, an electronic notification indicating that the second data linking query cannot be completed.

3. The computer-implemented method according to claim 1, wherein the predetermined redemption period is twenty-four hours.

4. The computer-implemented method according to claim 1, wherein updating, in the network database, the first dataset based on the transmission indication further comprising:
   determining whether the partial amount satisfies the restricted value; and
   in response to determining that the partial amount does not satisfy the restricted value, decreasing the restricted value based on the partial amount.

5. The computer-implemented method according to claim 1, wherein updating, in the network database, the first dataset based on the transmission indication further comprising:
   determining whether the partial amount satisfies the restricted value; and
   in response to determining that the partial amount satisfies the restricted value, outputting, to the client device, the redemption completion indication.

6. The computer-implemented method according to claim 1, further comprising:
   outputting, to the client device, a dataset linking interface, wherein the dataset linking interface includes a plurality of impressions associated with a plurality of datasets; and
   receiving, via the dataset linking interface, a selection of an impression corresponds to the first dataset from the plurality of datasets.

7. An apparatus comprising a processor and at least one non-transitory memory including program code, the at least one non-transitory memory and the program code configured to, with the processor, cause the apparatus to at least:
   in response to receiving a dataset generation request associated with a completed transaction indication, trigger generating, in a network database, a first dataset associated with a client account, wherein the first dataset indicates a restricted value from the completed transaction indication;
   determine that the first dataset is linkable to an instrument identifier of a physical instrument associated with the client account;
   in response to receiving, from a client device associated with the client account, a first data linking query to associate the first dataset with the instrument identifier, generate, in the network database, a dataset pointer establishing a data connection between the first dataset and the instrument identifier associated with the physical instrument based on the first data linking query;
   in response to receiving a transmission indication at a transmission indication time indicating a transmission between the physical instrument and a terminal device, trigger updating the first dataset in the network database based on the transmission indication, wherein the transmission indication indicates the instrument identifier and a partial amount associated with the first dataset; and in response to expiration of a predetermined redemption period following the transmission indication time, output, to the client device, a redemption completion indication indicating that the restricted value associated with the first dataset has been redeemed, wherein the predetermined redemption period is defined by the first dataset.

8. The apparatus according to claim 7, wherein the at least one non-transitory memory and the program code are further configured to, with the processor, cause the apparatus to:

generate, in the network database, a second dataset associated with the client account;

receive, from the client device, a second data linking query to associate the second dataset with the instrument identifier;

determine whether the second dataset is linkable; and in response to determining that the second dataset is not linkable, output, to the client device, an electronic notification indicating that the second data linking query cannot be completed.

9. The apparatus according to claim 7, wherein the predetermined redemption period is twenty-four hours.

10. The apparatus according to claim 7, wherein the at least one non-transitory memory and the program code are further configured to, with the processor, cause the apparatus to:

determine whether the partial amount satisfies the restricted value; and in response to determining that the partial amount does not satisfy the restricted value, decrease the restricted value based on the partial amount.

11. The apparatus according to claim 7, wherein the at least one non-transitory memory and the program code are further configured to, with the processor, cause the apparatus to:

determine whether the partial amount satisfies the restricted value; and in response to determining that the partial amount satisfies the restricted value, output, to the client device, the redemption completion indication.

12. The apparatus according to claim 7, wherein the at least one non-transitory memory and the program code are further configured to, with the processor, cause the apparatus to:

output, to the client device, a dataset linking interface, wherein the dataset linking interface includes a plurality of impressions associated with a plurality of datasets; and receive, via the dataset linking interface, a selection of an impression corresponds to the first dataset from the plurality of datasets.

13. A computer program product comprising at least one non-transitory computer-readable storage medium having computer-readable program code portions stored therein, the computer-readable program code portions comprising an executable portion configured to:

in response to receiving a dataset generation request associated with a completed transaction indication, trigger generating, in a network database, a first dataset associated with a client account, wherein the first dataset indicates a restricted value from the completed transaction indication;

determine that the first dataset is linkable to an instrument identifier of a physical instrument associated with the client account;

in response to receiving, from a client device associated with the client account, a first data linking query to associate the first dataset with the instrument identifier, generate, in the network database, a dataset pointer establishing a data connection between the first dataset and the instrument identifier associated with the physical instrument based on the first data linking query;

in response to receiving a transmission indication at a transmission indication time indicating a transmission between the physical instrument and a terminal device, trigger updating the first dataset in the network database based on the transmission indication, wherein the transmission indication indicates the instrument identifier and a partial amount associated with the first dataset; and in response to expiration of a predetermined redemption period following the transmission indication time, output, to the client device, a redemption completion indication indicating that the restricted value associated with the first dataset has been redeemed, wherein the predetermined redemption period is defined by the first dataset.

14. The computer program product according to claim 13, wherein the executable portion is further configured to:

generate, in the network database, a second dataset associated with the client account;

receive, from the client device, a second data linking query to associate the second dataset with the instrument identifier;

determine whether the second dataset is linkable; and in response to determining that the second dataset is not linkable, output, to the client device, an electronic notification indicating that the second data linking query cannot be completed.

15. The computer program product according to claim 13, wherein the predetermined redemption period is twenty-four hours.

16. The computer program product according to claim 13, wherein the executable portion is further configured to:

determine whether the partial amount satisfies the restricted value; and in response to determining that the partial amount does not satisfy the restricted value, decrease the restricted value based on the partial amount.

* * * * *